United States Patent
Krivos et al.

(10) Patent No.: US 12,089,785 B2
(45) Date of Patent: Sep. 17, 2024

(54) BLENDING CONTAINER WITH PLATE INSERT AND BLADE ASSEMBLY

(71) Applicant: Vita-Mix Management Corporation, Olmsted Township, OH (US)

(72) Inventors: Brenton Krivos, Brunswick, OH (US); Mark Miller, Olmsted Township, OH (US); Stephen Rukavina, Rocky River, OH (US)

(73) Assignee: Vita-Mix Management Corporation, Olmsted Township, OH (US)

( * ) Notice: Subject to any disclaimer, the term of this patent is extended or adjusted under 35 U.S.C. 154(b) by 263 days.

(21) Appl. No.: 16/887,019

(22) Filed: May 29, 2020

(65) Prior Publication Data

US 2020/0375402 A1 Dec. 3, 2020

Related U.S. Application Data

(60) Provisional application No. 62/855,018, filed on May 31, 2019.

(51) Int. Cl.
*A47J 43/07* (2006.01)
*A47J 43/046* (2006.01)
*A47J 43/08* (2006.01)

(52) U.S. Cl.
CPC ......... *A47J 43/0716* (2013.01); *A47J 43/046* (2013.01); *A47J 43/085* (2013.01)

(58) Field of Classification Search
CPC .... A47J 43/046; A47J 43/0716; A47J 43/085; B01F 2035/351
See application file for complete search history.

(56) References Cited

U.S. PATENT DOCUMENTS

| | | | | |
|---|---|---|---|---|
| 2,304,476 | A * | 12/1942 | Poplawski | A47J 43/046 D7/378 |
| 4,889,248 | A * | 12/1989 | Bennett | A47J 43/046 215/390 |
| 8,282,268 | B2 * | 10/2012 | Karkos, Jr. | A47J 43/085 366/314 |
| 2016/0143483 | A1 * | 5/2016 | Boozer | F16B 39/32 366/314 |
| 2016/0331181 | A1 * | 11/2016 | Dickson, Jr. | A47J 43/0722 |
| 2017/0086621 | A1 * | 3/2017 | Bascom | A47J 43/0722 |
| 2017/0354940 | A1 * | 12/2017 | Kolar | B01F 27/808 |
| 2018/0008097 | A1 * | 1/2018 | Mehlman | B01F 35/3204 |
| 2018/0160855 | A1 * | 6/2018 | Krivos | A47J 43/0761 |
| 2018/0168402 | A1 * | 6/2018 | Arnett | A47J 43/0716 |
| 2018/0168403 | A1 * | 6/2018 | Boozer | B01F 27/86 |

FOREIGN PATENT DOCUMENTS

| CN | 107713705 A | * | 2/2018 | |
|---|---|---|---|---|
| WO | WO-2017063872 A1 | * | 4/2017 | A47J 27/004 |

OTHER PUBLICATIONS

Google machine translation for "CN-107713705-A" (Year: 2018).*

* cited by examiner

*Primary Examiner* — Elizabeth Insler
(74) *Attorney, Agent, or Firm* — Dinsmore & Shohl LLP

(57) ABSTRACT

A blending system includes a container assembly. The container assembly includes a body. The body has a closed end and an open end. A plate insert is attached to the closed end. A blade assembly is attached to the plate insert. The blade assembly includes a blade. The blade may be balanced.

17 Claims, 20 Drawing Sheets

SECTION C-C

BLENDING CONTAINER WITH PLATE INSERT AND BLADE ASSEMBLY

CROSS-REFERENCE TO RELATED APPLICATIONS

This application claims priority to U.S. Provisional Patent Application No. 62/855,018 filed on May 31, 2019, entitled "BLENDING CONTAINER WITH PLATE INSERT AND BLADE ASSEMBLY," the entirety of which is incorporated herein by reference

TECHNICAL FIELD

The present teachings relate to a blending system and method, and more particularly, to a container and blade for a blender.

BACKGROUND

Blenders and blending systems are often used to blend and process foodstuffs. Conventional blenders generally include a base with a motor and a mixing container with an operable mixing blade disposed therein. A blender lid is adapted to cover the mixing container. A user inserts contents within the mixing container to be mixed by the rotation of the blade. The container is positioned on the base as a user controls the operation of the motor within the base to rotate the mixing blade within the container to mix the contents therein.

Frozen, frosty, or icy drinks have become increasingly popular. Such drinks include the traditional shakes, and the more recently popular smoothies. Shakes, or milkshakes, are typically formed of ice cream and/or milk, and flavored as desired, with or without additives, such as candies, chocolates, peanut butter, fruits, etc. Milkshakes typically are available at most fast-food restaurants, such as burger chains, and may be made by special machines, or hand-made using mixers. Smoothies tend to be healthier, and may be formed of ice, frozen yogurt, and/or sorbet. Smoothies may include additives such as fruits, fruit juice, vegetables, vitamins, supplements, etc. Smoothies typically are available from specialty chains or juice bars, and may be made with a commercial or restaurant-grade blender. Such drinks also may be made at home, using a personal blender.

In commercial kitchens, for example, businesses that make recipe-based food products desire speed and accuracy in preparing such products. Such businesses often prepare different orders in succession. They may also use blending containers more often than other users.

Generally, a blender blade may have two or more blade wings extending in opposite directions from a drive shaft. Each of the two blade wings may be equipped with cutting surfaces along their leading edges. During operation of a blender, the blender blade may rotate about an axis of rotation, and the cutting surfaces may cut through the working medium provided in the blender container. Oftentimes, the blade wings may be angled in relation to the blade body to provide the blade wings with angles of attack. Varying the angles of attack of the blade wings may be used to control the axial flow of the working medium.

In order to understand the consequences of angling the blade wings in relation to the blade body, the angle of attack in relation to airfoils must be understood. With airfoils, the angle of attack may be determined in relation to the chord line of the airfoil. The chord line is the line drawn from the leading edge to the trailing edge of the airfoil, and the angle of attack is the angle formed between the chord line and horizontal. As the angle of attack of the airfoil is varied, the "lift" generated by the airfoil is also varied.

For example, when an airfoil has a positive angle of attack, the flowing medium may impinge on the lower surface of the airfoil. Consequently, the angle of attack may cause the lower surface to deflect the flowing medium away from the airfoil. The amount of deflection is related to the orientation of the airfoil. That is, there is more deflection when there is a high angle of attack and less deflection when there is a low angle of attack. Such deflection generates low pressures adjacent the upper surface of the airfoil.

For example, the lower surface may push flowing medium away from the path of the airfoil, and an absence of flowing medium may thereby be created adjacent the upper surface of the airfoil. Due to this absence of flowing medium, low pressures are provided adjacent the upper surface, and these low pressures generate the above-discussed lift. As such, higher angles of attack produce lower pressures adjacent the upper surface to generate more lift, and lower angles of attack produce lower pressures adjacent the upper surface to generate less lift.

The lift generated by the angle of attack of the above-discussed airfoil can be equated with the axial flow generated by the angle of attack of a blade wing. However, unlike the above discussed airfoil, the angle of attack of a blade wing may be determined by the forward or rearward "twist" of the blade wing (relative to its leading edge) along its longitudinal length. This twist determines how much working medium impinges the upper surface or lower surface of the blade wing. Without such impingement of working medium, the angle of attack would effectively be zero. For example, if the blade wing was angled upwardly or downwardly (but not twisted forwardly or rearwardly), the working medium would not impinge the blade wing, and the angle of attack of such a blade wing would be effectively zero.

To create the angle of attack, the blade wing may be twisted forwardly or rearwardly. When the blade wing is twisted forwardly, the working medium impinges the upper surface, and when the blade wing is twisted rearwardly, the working medium impinges the lower surface. The amount of twisting determines the amount of impingement and amount of axial flow, while the direction of the twisting (forwardly or rearwardly relative to its leading edge) determines the direction of the axial flow.

For example, if the blade wing is twisted forwardly relative to its leading edge, the working medium will impinge the upper surface of the blade wing, and low pressures will be generated adjacent the lower surface, thereby drawing working medium from above to below the blender blade. On the other hand, if the blade wing is twisted rearwardly relative to its leading edge, the working medium will impinge the lower surface, and low pressure will be generated adjacent the upper surface, thereby drawing working medium from below to above the blender blade. Either way, working medium is drawn through the cutting pattern of the blade wing.

It may be desirable to alter or improve the usable life of a container, and alter or improve properties of containers. In another aspect, it may also be desirable to decrease blending times or increase consistency. For instance, there is a need for a blending system that can more efficiently blend foodstuff and that may reduce overall preparation time.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

A container assembly may comprise a body comprising an open end and a closed end; and a plate insert comprising a plate insert body that is generally planar, wherein the plate insert is disposed within the closed end and overmolded with the closed end, and wherein the plate insert comprises a different material than the body. The closed end of the body may be generally planar and the plate insert body and the closed end may be generally coplanar. The body may comprise a food-grade plastic and the plate insert may comprise a metal. The plate insert may comprise at least one protrusion extending from an external perimeter of the plate insert. The at least one protrusion may comprise an aperture, and material of the body may be disposed within the aperture. The at least one protrusion may operatively prevent rotation of the plate insert relative the body. The plate insert may further comprise an aperture operatively receiving a mount of a blade assembly. The mount of a blade assembly may be free from contact with the closed end of the body. In another aspect, the container assembly may include a retainer nut that may operatively attach to the mount of a blade assembly, and wherein the retainer nut applies compression on the plate insert.

Also described is a container assembly comprising a container body comprising an open end and a closed end, wherein the container body comprises plastic; a blade assembly comprising a mount; and a plate insert disposed at the closed end and overmolded with the closed end, wherein the plate insert comprises metal, and wherein a first portion of the plate insert is free from contacting the plastic of the container body, and wherein the mount contacts the first portion of the plate insert such that the mount does not directly contact the plastic of the container body. The blade assembly may comprise at least one blade comprising a first wing and a second wing. The first wing and the second wing may comprise substantially similar shapes. The first wing and the second wing may comprise substantially similar weights. The blade assembly may comprise a shaft and wherein the first wing and the second wing are balanced with reference to the shaft. The container assembly may further comprise a bearing comprising a metal material, wherein the mount further operatively attaches to the bearing and the plate insert, and wherein the bearing contacts the closed end.

A method of forming a container assembly is described. The method includes molding a container body comprising a wall, an open end, and a closed end; and overmolding a plate insert in the closed end, wherein at least a portion of the plate insert is not overmolded. The method may comprise operatively attaching a blade assembly to the plate insert. The method may comprise operatively attaching a wireless tag to the container body. The method may comprise providing the plate insert as a metal plate. The metal plate insert may comprise at least one protrusion.

The following description and the drawings disclose various illustrative aspects. Some improvements and novel aspects may be expressly identified, while others may be apparent from the description and drawings.

DESCRIPTION OF THE DRAWINGS

The present teachings may be better understood by reference to the following detailed description taken in connection with the following illustrations, wherein.

Figure 1:
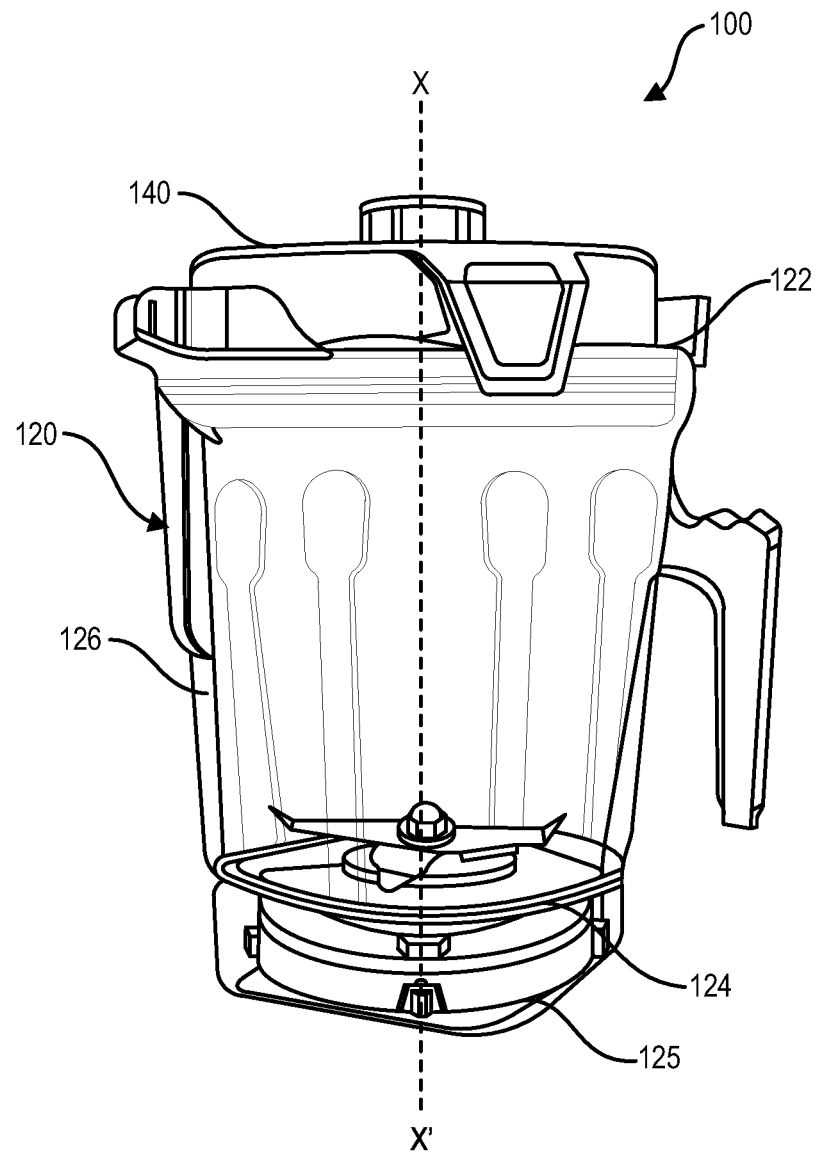
FIG. 1 is a side view of a container with a plate insert in accordance with various disclosed aspects.
Figure 2:
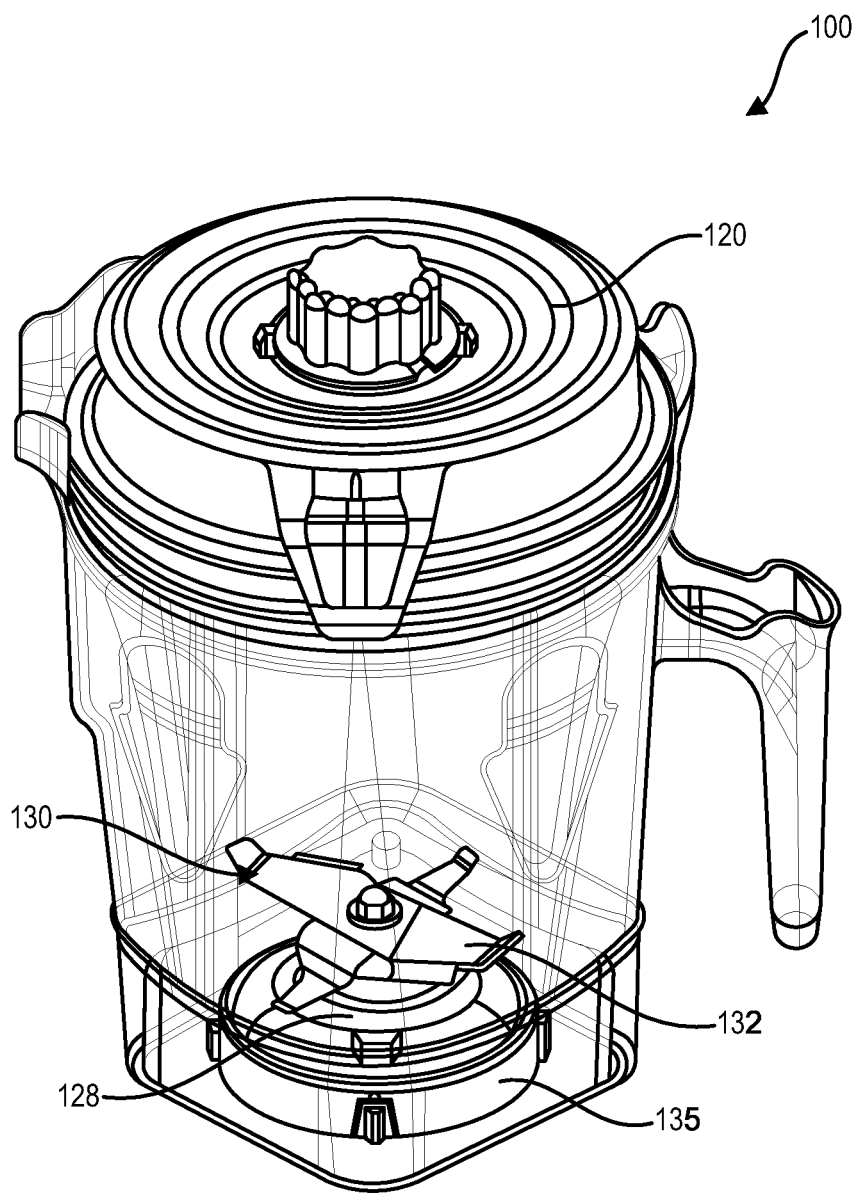
FIG. 2 is a top and perspective view of the container of FIG. 1 in accordance with various disclosed aspects.
Figure 3:
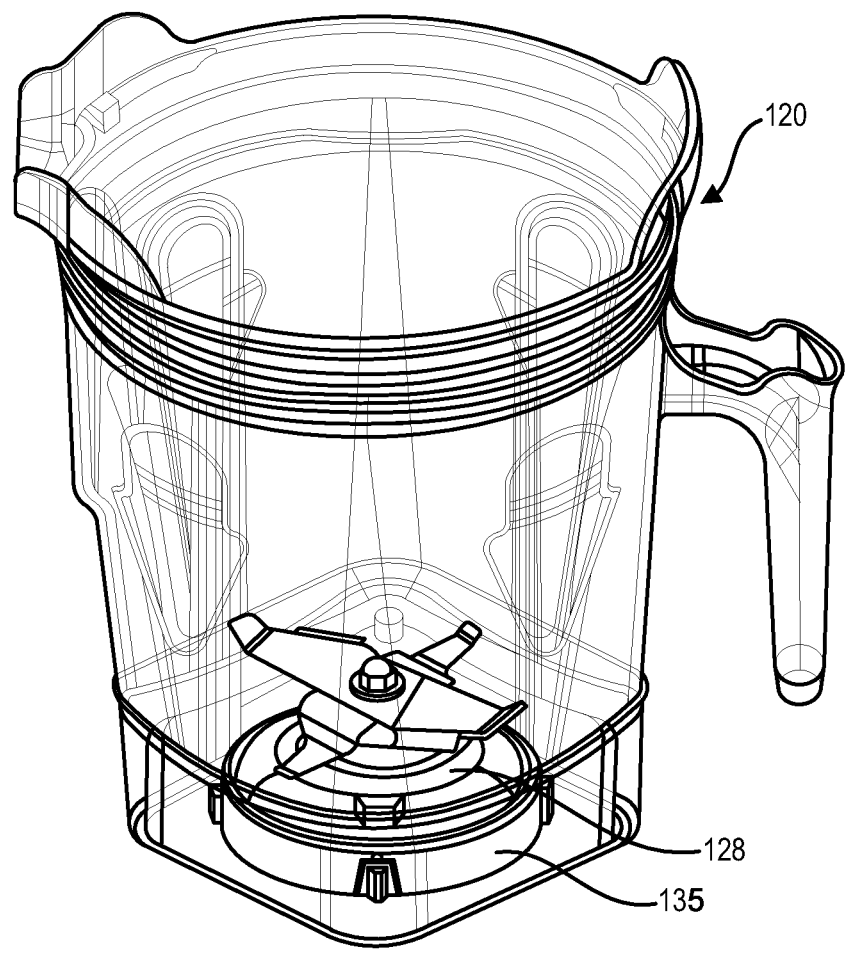
FIG. 3 is a top and perspective view of the container of FIG. 1 with a lid removed in accordance with various disclosed aspects.
Figure 4:
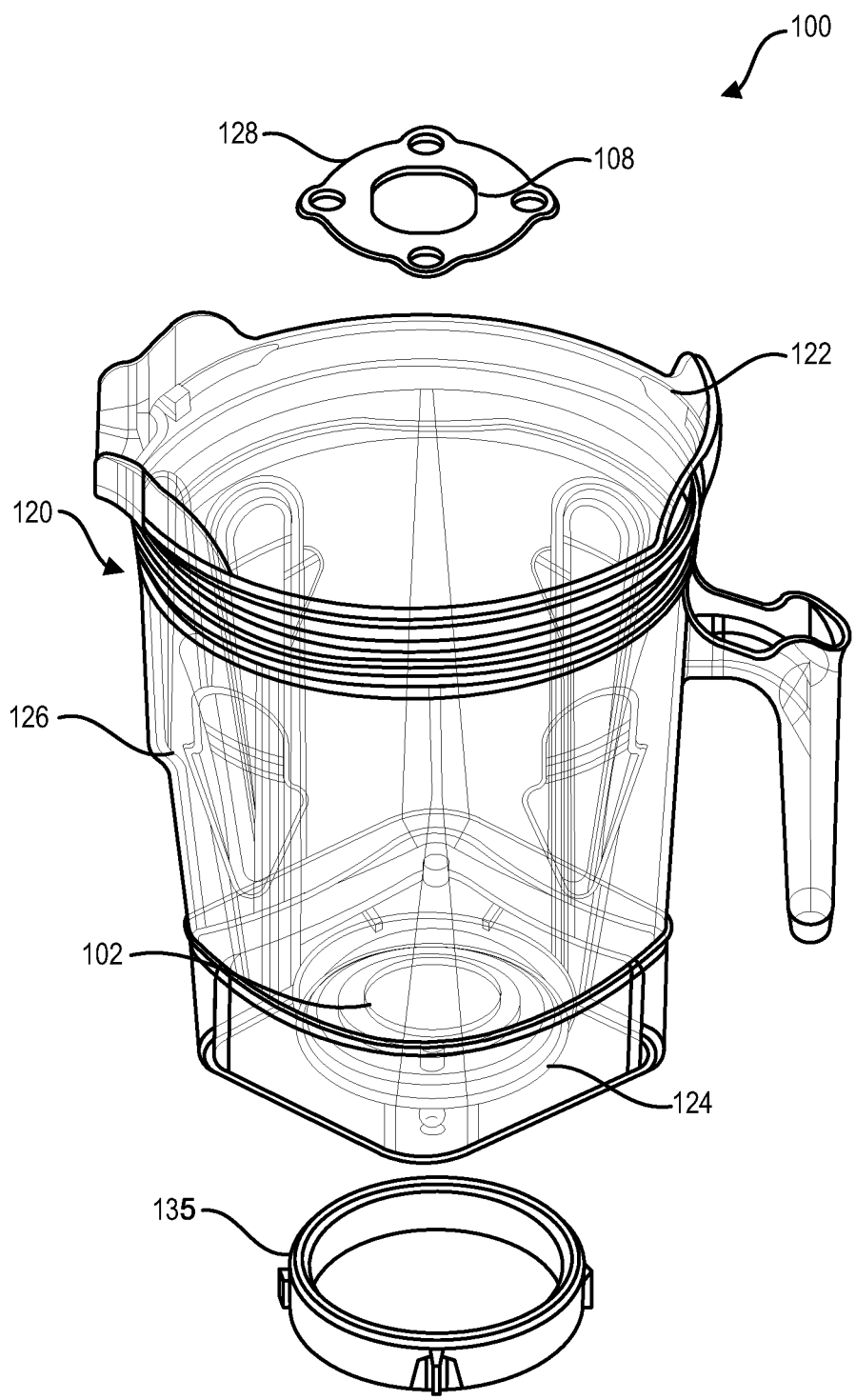
FIG. 4 is an exploded view of the container of FIG. 1 with a lid removed in accordance with various disclosed aspects.

The invention may be embodied in several forms without departing from its spirit or essential characteristics. The scope of the invention is defined in the appended claims, rather than in the specific description preceding them. All embodiments that fall within the meaning and range of equivalency of the claims are therefore intended to be embraced by the claims.

DETAILED DESCRIPTION

Reference will now be made in detail to embodiments of the present teachings, examples of which are illustrated in the accompanying drawings. It is to be understood that other embodiments may be utilized and structural and functional changes may be made without departing from the scope of the present teachings. Moreover, features of the embodiments may be combined, switched, or altered without departing from the scope of the present teachings, e.g., features of each disclosed embodiment may be combined, switched, or replaced with features of the other disclosed embodiments. As such, the following description is presented by way of illustration and does not limit the various alternatives and modifications that may be made to the illustrated embodiments and still be within the spirit and scope of the present teachings.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise.

"Logic" refers to any information and/or data that may be applied to direct the operation of a processor. Logic may be formed from instruction signals stored in a memory (e.g., a non-transitory memory). Software is one example of logic. In another aspect, logic may include hardware, alone or in combination with software. For instance, logic may include digital and/or analog hardware circuits, such as hardware circuits comprising logical gates (e.g., AND, OR, XOR, NAND, NOR, and other logical operations). Furthermore, logic may be programmed and/or include aspects of various devices and is not limited to a single device.

It is noted that references to a blender, blending system, and the like, are understood to include food processor systems and other mixing systems. Such systems generally include a blender base that may include a motor, a blade assembly, and a controller. Further, such systems may include a container, a display, a memory and/or a processor. A blade assembly, a blending container, and a blender base may removably or irremovably attach. The blending container may be powered in any appropriate manner, such as disclosed in U.S. patent application Ser. No. 14/213,557, entitled Powered Blending Container, which is hereby incorporated by reference.

Furthermore, while blending of "ingredients," "contents," or "foodstuffs" is described by various embodiments, it is noted that non-food stuff may be mixed or blended, such as paints, epoxies, construction material (e.g., mortar, cement, etc.) and the like. Moreover, blending of ingredients may result in a blended product. Such blended products may include drinks, frozen drinks, smoothies, shakes, soups, purees, sorbets, butter (nut), dips, or the like. Accordingly, such terms may be used interchangeably unless context suggests otherwise or warrants a particular distinction among such terms. Further, such terms are not intended to limit possible blended products and should be viewed as examples of possible blended products.

In embodiments, the blending systems may include any household blender and/or any type of commercial blending system, including those with covers that may encapsulate or partially encapsulate the blender as well as those that may be handheld and inserted into foodstuff by a user. Commercial blending systems may include an overall blending system, such as a modular blending system that may include the blender along with other components, such as a cleaner, foodstuff storage device (including a refrigerator), an ice maker and/or dispenser, a foodstuff dispenser (a liquid or powder flavoring dispenser), or any other combination of such.

As used herein, the phrases "blending process," "blending program," and the like are used interchangeably unless context suggests otherwise or warrants a particular distinction among such terms. A blending process may comprise a series or sequence of blender settings and operations to be carried out by the blending device. In an aspect, a blending process may comprise at least one motor speed and at least one time interval for the given motor speed. For example, a blending process may comprise a series of blender motor speeds to operate the blender blade at the given speed, a series of time intervals corresponding to the given motor speeds, and other blender parameters and timing settings. The blending process may further include a ramp up speed that defines the amount of time the motor takes to reach its predetermined motor speed. The blending process may be stored on a memory and recalled by or communicated to the blending device.

The terms "identification tag," "chip," "NFC component," and the like may be used interchangeably, unless context suggests otherwise or warrants a particular distinction among such terms. Such may refer to an NFC component or tag, which may be capable of sending/receiving a signal. It is noted that embodiments may utilize other radio frequency identification (RFID) devices, transponders, or tags. Accordingly, embodiments reference NFC for brevity, but such embodiments may utilize other RFID devices, methods, or systems. It is further noted that RFID tags may be chosen based on a frequency (e.g., low frequency RFID tags for close communication). Identification tags may comprise printable RFID tags, NFC tags, tags including microchips, or the like. Identification tags can contain stored information, such as in a memory (e.g., read-only memory (ROM), random access memory (RAM), electrically erasable programmable read-only memory (EEPROM), or various other types of memory). In another aspect, an identification tag may be powered by electromagnetic induction from magnetic fields produced by a reader. For instance, an identification tag may include an NFC component that uses induction between two loop antennae located within the container's near field, effectively forming an air-core transformer. The antennae may comprise various materials, such as copper. While an air-core transformer is described, various other antennae formations may be utilized.

In an example, an NFC component may include an NFC tag and an NFC emitter. The NFC tag and NFC emitter may each include one or more antennae. For instance, the NFC tag may include a loop antenna and the NFC emitter may include another loop antenna. It is noted that the loop antennae may or may not be substantially similar to each other. The NFC tag antenna and NFC emitter antenna may be operatively coupled via an electromagnetic field. The coupling may form or represent an air-core coil or transformer. The NFC emitter may generate an alternating current that may be received by the NFC emitter antenna. The current may induce an electromagnetic field through the air or another carrier medium. The electromagnetic field may induce a current in the NFC tag antenna. The received current may provide power to various components of the NFC tag.

In various embodiments, an NFC tag may include the antenna (e.g., inlay), a processor, and a memory device. The memory device may include various types of memory, such as electrically erasable programmable read-only memory (EEPROM) and the like. When the NFC tag is powered (e.g., current induced by the electromagnetic field), the NFC tag may generate a response that may be received by the NFC emitter.

As described herein, the identification tag may be a passive transponder that collects energy from interrogating radio waves and/or may include a local power source such as a battery. As such, an identification tag and a reader may be configured as a passive reader active tag (PRAT) system, active reader passive tag (ARPT) system, an active reader active tag (ARAT) system, or the like.

In another aspect, an identification tag may power various components or devices. For example, an NFC component may power a digital display and/or interface of a container. In embodiments, the identification tag may be configured to operate and/or communicate with a reader when within a threshold distance. For instance, an identification tag may communicate with a reader when the identification tag is less than or equal to j units from the reader, where j is a number and the unit is a unit of distance. In an example, the identification tag may operate when it is less than or about six centimeters from the reader, when it is less than or about one meter from the reader, etc.

In some traditional systems, containers are made of plastic materials. A blade assembly is attached to the container and a blender base drives the blade assembly with a motor. The parameters of the motor (e.g., speed, torque, etc.) may be constrained to limit or reduce the wear or strain on the container. In other examples, the motor may be allowed to operate at different parameters and the life expectancy of the container may be decreased relative to systems that limit the motor parameters.

Moreover, traditional blade assemblies can include blades that are not balanced or are otherwise asymmetric. For instance, a blade assembly may include two blade wings. The cutting path of each blade wing is defined by the leading edge of the blade wing. Each of the blade wings may be angled, twisted, or otherwise shaped so that the leading edges of the two blade wings are not the same. This means that the cutting path is not the same. Some other blades are upturned or angled from a center body relative a drive shaft. Examples of such blades are shown in U.S. Pat. Nos. 7,552,885 and 8,690,093, the entireties of which are incorporated by reference herein. The metal blades are designed with specific bends and geometries to create thrust (pull material past the blade) and shear (cutting and aerating action). The location, size and angle of each bend dictates the effect the bent portion will have during blending.

Disclosed herein are blending systems and methods that provide a container comprising a reinforced bottom. The reinforced bottom may allow for improved performance, use of additional motor parameters, use of different blade assemblies, and the like. For instance, the blending container may comprise increased lifespans and may be capable of handling increased speed or torque from motors. In embodiments, the bottom may be reinforced via an overmolded plate insert. The plate may comprise metal or another material that is different from the material of the container, such as rubbers, foams, or plastics having a greater creep resistance than the material used for the container. For example, the container may comprise a food-grade plastic such as TRITON and the plate insert may comprise a polyimide (e.g., VESPEL), ECTFE (Halar®)—with outstanding mechanical properties and dimensional stability, ethylene chlorotrifluoroethylene (ECTFE), polyamide-imide (PAI), polyetheretherketone (PEEK), or other plastics. The container may be molded into a desired shape with a closed end and an open end. The plate insert may be disposed within the closed end and may be overmolded. In examples, at least a portion of the plate insert is exposed. The exposed portion may comprise an aperture that receives a blade assembly. The blade assembly may be secured into place and compressed against or with the exposed portion of the plate insert. The blade assembly may be secured via a retainer nut or the like. The plate insert may improve or increase the strength of the container relative to containers without a plate insert. In an aspect, the exposed portion of the plate insert may serve as the only component or one of the components of the container under compressive force due to attachment of the blade assembly. In another aspect, the plate insert may contact the blade assembly to absorb stress or vibrations. This may prevent or reduce stress on plastic portions of the container. Reduced vibration may reduce or prevent container breakage and bearing failure.

In another aspect, embodiments may include a blade. The blade may comprise a balanced blade comprising two or more wings that comprise a generally similar or the same cut path. For instance, the blade may comprise a body, a first wing comprising a compound or upturned portion, a wing tip, and a wing flap. In another aspect, the blade may include a second wing comprising a compound or upturned portion, a wing tip, and a wing flap. The balance of the blade may allow for increased speeds or torque. For example, a balanced blade may produce less vibration than an unbalanced blade. At high speeds or RPMs the vibration reduction may be more prevalent. Reduced vibration may reduce or prevent blade breakage, container breakage and bearing failure. In embodiments, a container may include a plate insert with or without a balanced blade.

It is noted that described containers or blade assemblies may include NFC tags or other identification tags. The tags may be utilized to determine whether a container, lid, base, enclosure, or other components of a blending system are interlocked, not interlocked, in closed or open positions, or the like. It is further noted that the identification tags may include information that may be utilized to identify a make and model of the container, the blade assembly, or other components. In some, a blender base may identify blending programs that may be utilized with the identified components. It is also noted that identification tags may include or identify parameters for the particular components. In an example, containers comprising inserts as described herein and/or blades described herein may include information stored in identification tags that enables a blender base to execute a particular program. It is noted that programs that may be utilized with the disclosed embodiments may include motor parameters (e.g., speed, torque, power, etc.) at elevated levels, which conventional wisdom traditionally identifies as too high of levels. Embodiments described herein, however, provide for results that have shown to be unexpectedly superior given the conventional wisdom.

Turning to FIGS. 1-5, shown is a blending container 100 that may be operatively attached to a blender base as described herein. The blending container 100 may primarily comprise a body 120 coupled to a blade assembly 130, and an operatively attached lid 140. The body 120 may comprise an open end 122, a closed end 124, a wall 126 disposed between the open end 122 and the closed end 124, and an apron 125.

Figure 5:
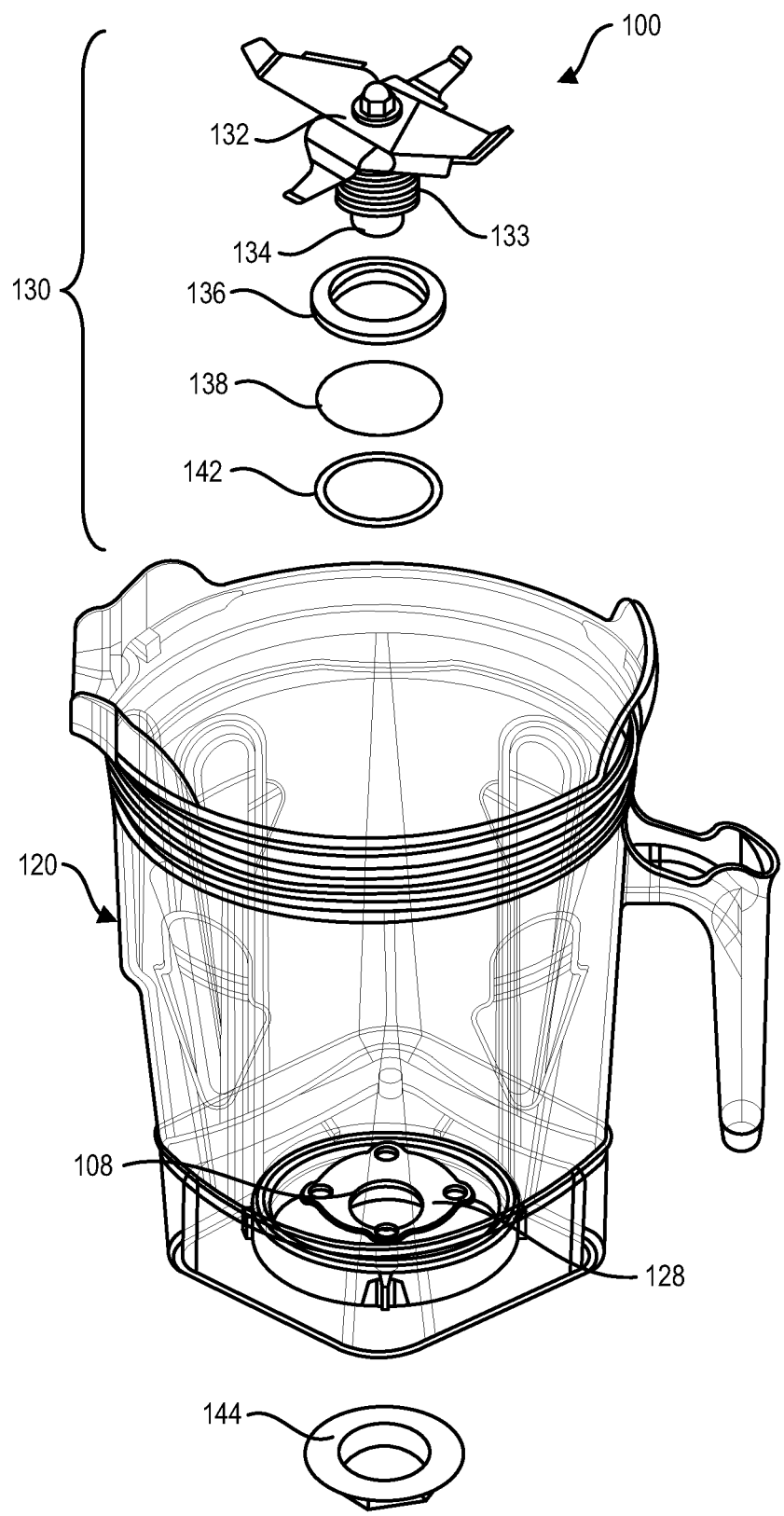
FIG. 5 is an exploded view of a blade assembly in accordance with various disclosed aspects.

Container 100 may receive food for blending. The blade assembly 130 is operatively attached to the closed end 124 for blending the food received within the container 100. In at least some embodiments, a retainer nut assembly 144 operatively secures the blade assembly 130 with closed end 124 as best shown in FIG. 5. It is noted that a blender base may control operation of the blade assembly 130 as described herein.

Container 100 may include a glass, plastic, or other moldable material, including, without limitation tritan. In various embodiments, the container 100 may be at least partially clear, opaque, colored, tinted, or the like. The side wall 126 may define a working volume or cavity along with the closed end 124. Perimeters of the wall 126 may decrease in size from the open end 122 towards the closed end 130, such as in a conical-like fashion. That is, cross-sectional perimeters of the wall 126 may become smaller along the X-axis from the open end 122 towards the closed end 130. It is noted, however, that various other shapes or configurations may be utilized. Further, perimeters of the wall 126 may be substantially equal along portions of the X-axis. It is noted that container 100 may comprise various shapes and sizes. For instance, wall 126 may have a curved or cylindrical shape. In other embodiments, the wall 126 may comprise various shapes such as a rectangular prism, a triangular prism, an n-sided polygonal prism, or irregular in shape. As depicted, closed end 130 may be predominantly rectangular or square, while open end 122 may be predominantly circular. In an aspect, perimeter wall 126 may transition from generally square in shape when proximal to bottom 130 to generally circular in shape when proximal to opening 122.

Moreover, the container 100 may comprise a handle, flutes, spouts, displays, or other components as described herein. In an example, the wall 126 may include one or more ridges or flutes that protrude from wall 126 towards the X-axis. Flutes may run substantially vertically from at or near closed end 124 to at or near open end 122. Further, it is noted that a flute may comprise one or more exaggerated members positioned along portions of the flute. In other embodiments, exaggerated members may be at different locations than said flutes or may be separate formations than the flutes. The shape and geometric features of the body may assist or improve a blending process to interrupt the flow of foodstuff. This may reduce vortex formation and improve blending of food stuff.

As best shown in FIGS. 2-5, the container 100 may include or be coupled with a plate insert 128. The plate insert 128 may comprise metal or another appropriate material. In an aspect, a metal insert may comprise strength for resistance to sheer forces or torque that may result from operation of the blade assembly 130. According to embodiments, the plate insert 128 may be disposed at or within the closed end 124. It is noted that the plate insert 128 may be overmolded within the closed end 124. In some examples, the plate insert 128 may be attached or coupled with the closed end 124 via fasteners, chemical adhesives, magnets, or the like.

Figure 6:
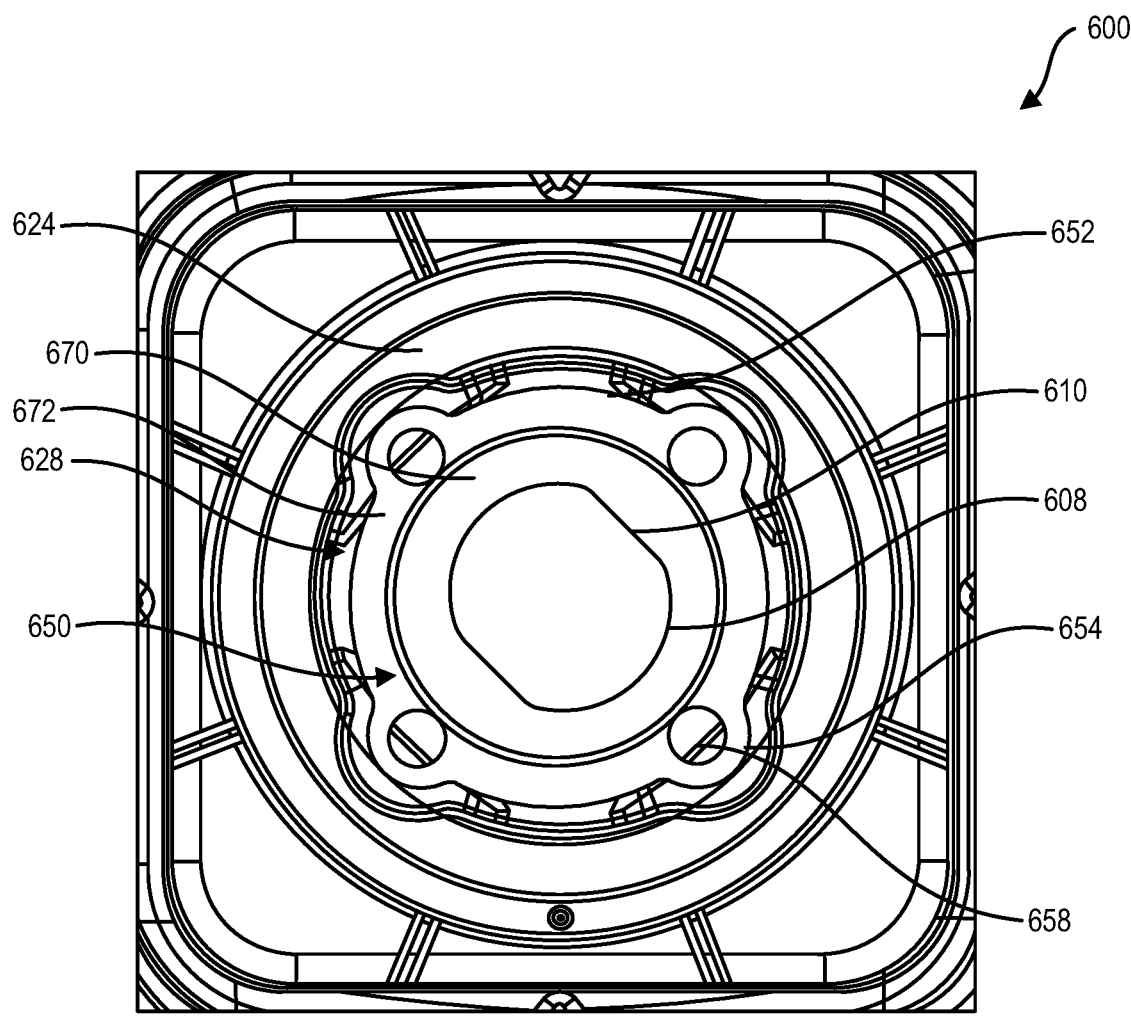
FIG. 6 is a top view of a container assembly with a plate insert including four protrusions in accordance with various disclosed aspects.
Figure 7:
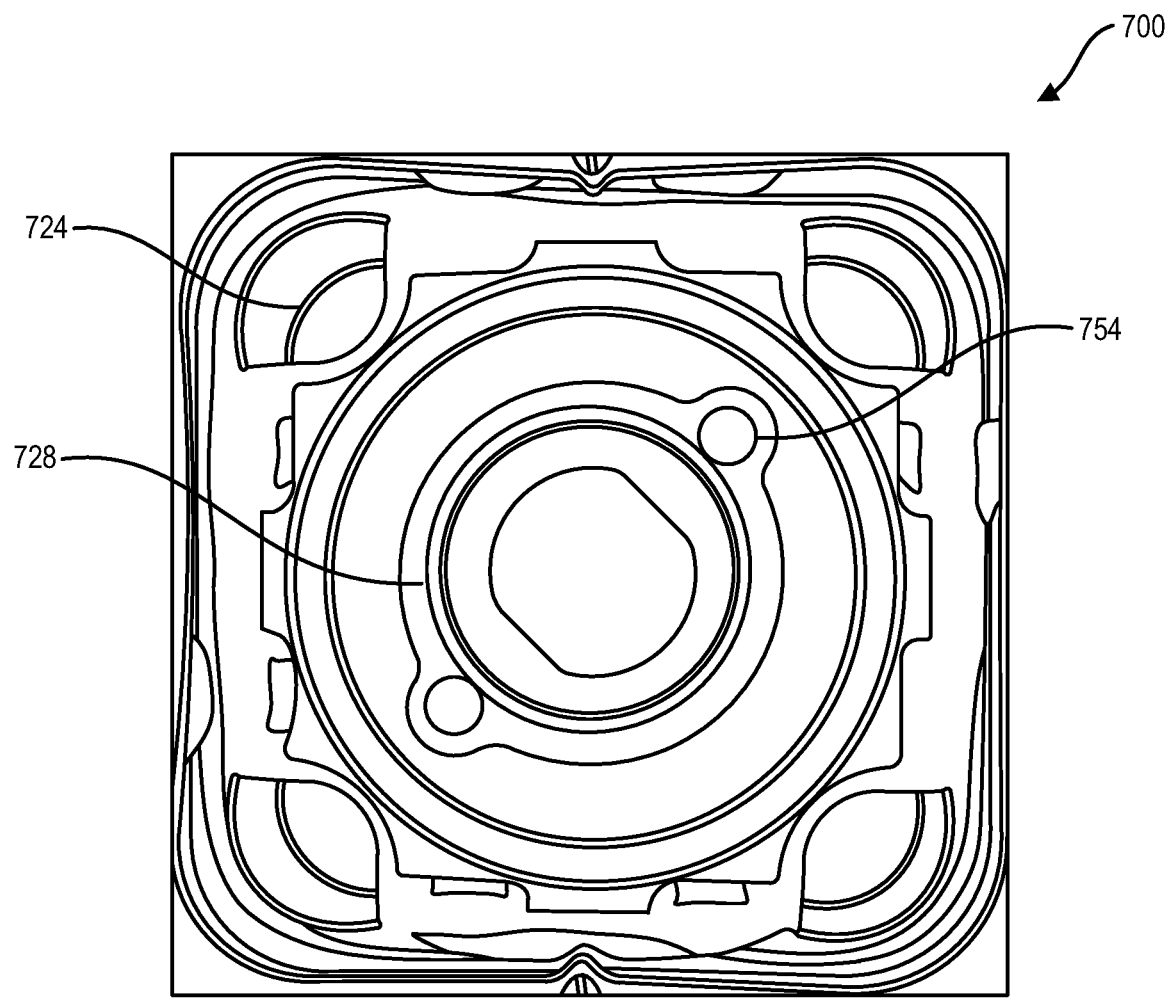
FIG. 7 is a top view of a container assembly with a plate insert including two protrusions in accordance with various disclosed aspects.
Figure 8:
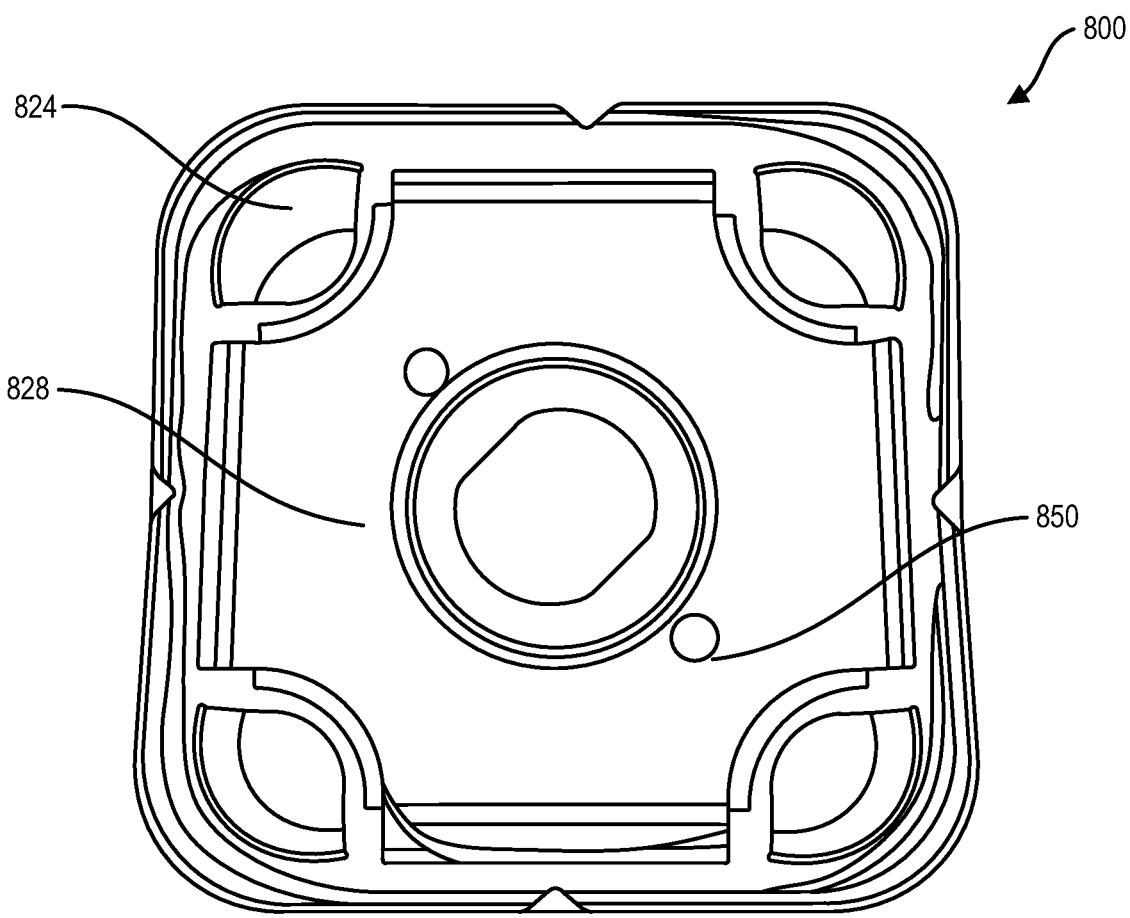
FIG. 8 is a top view of a container assembly with a plate insert including teeth protrusions in accordance with various disclosed aspects.

The plate insert 128 is generally disposed proximal an opening or aperture 102 of the closed end 124. As described herein, the plate insert 128 may include an aperture 108. The aperture 108 of the plate insert 128 may be generally equal to or smaller in perimeter size than the aperture 102 of the closed end 124. For instance, the plate insert 128 may be at least partially exposed to the working volume of the container 100 through the aperture 102, as best shown in FIGS. 6-8. It is noted that the plate insert 128 may comprise various appropriate shapes as described in more detail herein. In at least some embodiments, the plate insert 128 may be utilized with an inductive heating device, such as shown and described in U.S. Pro. Pat. App. No. 62/745,543, the entirety of which is incorporated herein by reference.

According to embodiments, the plate insert 128 may receive the blade assembly 130 through an aperture of the plate insert 128. The plate insert 128 may contact the blade assembly 130 such that the blade assembly is attachable to the container body 120. For instance, the plate insert 128 may be overmolded or otherwise attached to the closed end 124. The blade assembly 130 may then be positioned within the container body 120 and secured thereto via a retainer nut 144. The retainer nut 144 may be positioned within the apron 125, and may be disposed at or on a side of the closed end 124 that is opposite the working volume of the container body 120.

The blade assembly 130 may primarily include one or more blades 132, a mount 133, a spline 134, and gaskets 136, 138, and 142. It is noted that the gaskets 136, 138, and 142 may comprise appropriate materials. In an example, the gasket 136 may comprise a metal ring, the gasket 138 may comprise an O-ring comprising a polymer, and gasket 142 may comprise a flattened gasket comprising a polymer. When attached to the container 100, the gaskets 136, 138, and 142 may be compressed or under force to create a seal such that the flow of material from the working volume through the opening 108 is reduced or prevented.

In at least one embodiment, the mount 133 is positioned within the opening 108 such that the spline 134 extends below the closed end 124 and into the apron 125. The blades 132 are disposed in the working volume. The mount 133 may comprise male or female threads that are appropriately sized and shaped to couple with male or female threads of the retainer nut 144. In another aspect, the mount 133 may be of any appropriate shape, size, type or configuration, such as of a generally cone shaped configuration that may include a lower threaded section. For example, when assembled, the cone shaped configuration of the mount 133 may comprise a general downward angle relative to the blades 132. In another aspect, the lower threaded section of the mount 133 may comprise a generally cylindrical shape with one or more flattened sides. The flattened sides may cooperate with the shape of the opening 108 to prevent or reduce rotation of the mount 133.

Turning now to FIGS. 6-8, there are embodiments of a container 600, 700, and 800. It is noted that the containers 600, 700, and 800 may comprise similar or the same aspects as container 100, unless context suggests otherwise or a particular distinction is made. For instance, each container 600, 700, and 800 may comprise a food-grade plastic with an overmolded plate insert 628, 728, and 828 disposed in or at a bottom end 624, 724, and 824, respectively. It is noted that the plate inserts 628, 728, and 828 may comprise similar or the same aspects as described with reference to plate insert 128.

Plate insert 128 may comprise a body 650. The body 650 may comprise an aperture or opening 608. The opening 608 may comprise flat or straight portions 610 as described herein. In another aspect, the body 650 may be generally planner or flat. It is noted that the opening 607 may comprise other shapes, such as polygonal or non-polygonal shapes. According to at least one embodiment, the shape of the opening is not circular such that an appropriate portion of a blade assembly passing through the opening 608 is also not circular which may prevent rotation of a bearing housing of the blade assembly disposed at least partially within the opening 608 while the drive shaft of a blade assembly rotates within a bearing housing. The thickness of the body 650 may be appropriately selected based at least in part on the thickness of the closed end 624. In an example, the body 650 may be generally between i and j mm in thickness, where i and j are numbers. For instance, the body 650 may be generally between about 0.055 inches and 0.095 inches, or about 1.4 mm and 2.4 mm.

The body 650 may comprise any appropriate shape. For instance, the outer perimeter 652 may be generally circular, triangular, rectangular, an n-sided polygon, or irregular in shape. In an example, the body 650 may comprise one or more protrusions 654. The protrusions 654 may extend from the outer perimeter 652. The protrusions 654 may be generally circular, triangular, rectangular, an n-sided polygon, or irregular in shape. In an aspect, the protrusions 654 may generally prevent or reduce the plate insert 628 from disengaging with the closed end 624, or otherwise rotating within the closed end. It is noted that the protrusions 654 may include apertures 658 formed therein. The apertures 658 may allow the molded material to pass therethrough and then cool or harden. This may assist in preventing or reducing movement of the insert plate 628 due to vibrations or rotation of a blade assembly.

It is noted that embodiments may include k protrusions, where k is a number (e.g., 1, 2, 3, 4, etc.). For instance, FIG. 6 illustrates plate insert 628 with four protrusions 654. FIG. 7 illustrates plate insert 728 with two protrusions 754. Moreover, protrusions may comprise curved, convex, concave, spoked, angled, or other perimeters. In an example, curved protrusions may provide for reduced wear. In another aspect, an embodiment comprising four curved protrusions (e.g., as shown in plate insert 628) may provide for reduced wear and additional anti-rotation capabilities. It is further noted that various shapes and sizes of protrusions may be utilized.

As described here and elsewhere in this disclosure, the body 650 may comprise an exposed portion 670 and an unexposed portion 672. The exposed portion 670 is generally free of plastic or other overmolding on either side. Unexposed portion 672 is covered by plastic or other overmolding material at least on a side facing the working volume of the container. It is noted that the unexposed portion 672 may or may not be covered or otherwise in contact with plastic or other overmolding on a side opposed to the working volume. The exposed portion 670 may include the opening 608. In another aspect, a blade assembly may be disposed within the opening 608 and portions of a mount of a blade assembly may contact the opening 608. In an aspect, the blade assembly may be secured to the exposed portion 670 via a retainer nut, fastener, or other components as described here and elsewhere in this disclosure. As such, the exposed portion 670 may serve as the primary or only point of contact between the container 100 and the blade assembly. This may prevent or limit the material forming the body of the container from contacting the blade assembly. In embodiments where the body of the container 600 comprises plastic and the body 650 of the plate insert 628 comprises metal, the plastic is limited or prevented from contacting metal portions of the blade assembly, and prevented from contacting a mount of the blade assembly. This may reduce or prevent breakage of the container due to vibrations or stress resulting from operation of the blade assembly via a motor. In situations where high speeds are utilized, this plate insert 628 may be particularly well suited to prevent or reduce breakage or other decreases in functionality. In another aspect, the plate insert 628 may allow for higher speeds (e.g., RPMs), different blending patterns, or the like.

It is noted that the body 650 may be generally planar. The body 650 may be disposed within a closed end of the container such that the body 650 and the closed end are generally planar with each other. It is noted, however, that portions of the closed end may be non-planar to assist with flow of foodstuff. However, a generally central portion of the closed end may be predominantly planar. It is further noted that the protrusions 654 may be generally planar with the body. In another aspect, apertures 658 may be formed through the protrusions 654 or the body 650 generally orthogonally. For instance, the apertures may have an axis that is generally perpendicular to the closed end or parallel with an axis of rotation of the blade assembly.

Figure 9:
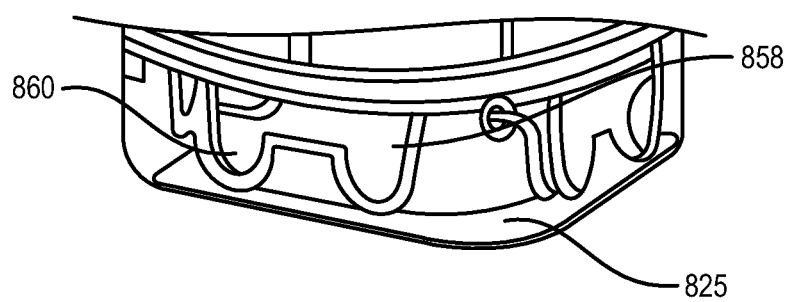
FIG. 9 is a side view of a container assembly of FIG. 8 in accordance with various disclosed aspects.

FIGS. 8-9 illustrate container 800 with the insert plate 828 comprising body 850. The body 850 may comprise a generally planar portion 860 and one or more teeth 858. The teeth 858 may extend from the planar portion 858 such that the teeth 858 are disposed on or within an apron 825 of the container 800. For instance, the apron 825 may comprise compartments 860 that are sized and shaped to receive the teeth 858. As described herein, the teeth 858 may be circular, triangular, rectangular, an n-sided polygon, or irregular in shape. In embodiments, the teeth 858 may prevent or reduce rotation of the body 850.

Turning back to FIGS. 1-5, the container 100 may include wireless communication devices, such as BLUETOOTH devices, NFC devices, or other RFID devices. For instance, the container 100 may include a wireless tag that may identify the make and model of the container 100. A blender base may include a wireless device operatively in communication with the container 100 to, for example, identify the container 100, identify historical information associated with the container, or identify appropriate blending programs and motor parameters to utilize for the container 100. It is noted that the container 100 may include an operatively attached NFC device 135. The NFC device 135 may include an NFC chip or tag disposed within an attachable body. In other examples, the container 100 may include an NFC chip disposed or overmolded within the body 1120 of the container 100.

Figure 10:
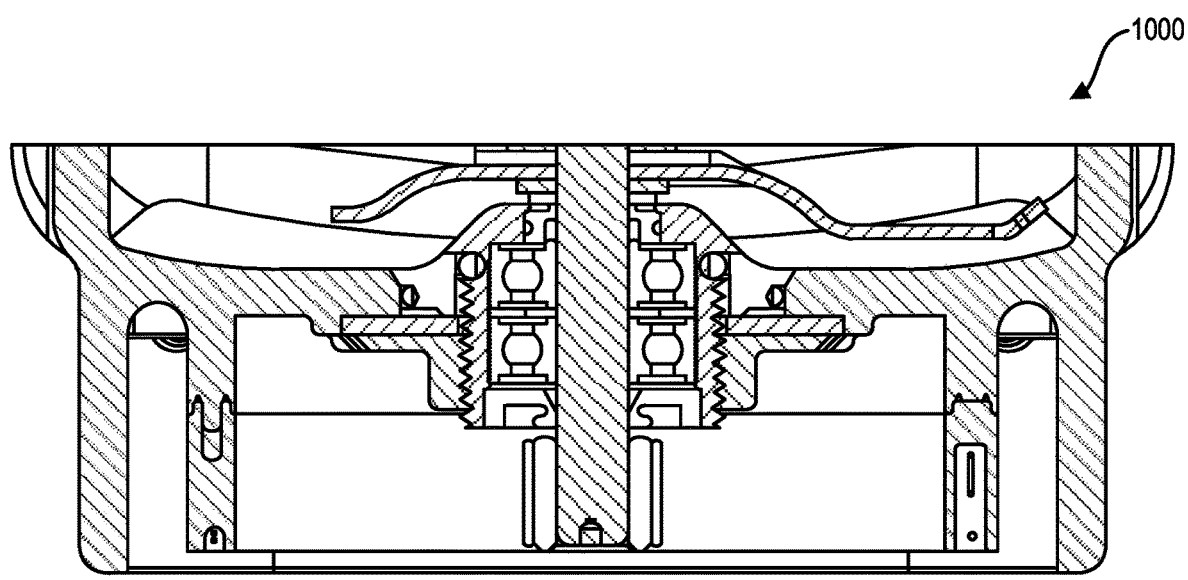
FIG. 10 is a cross-sectional view of a container with a plate insert in accordance with various disclosed aspects.
Figure 11:
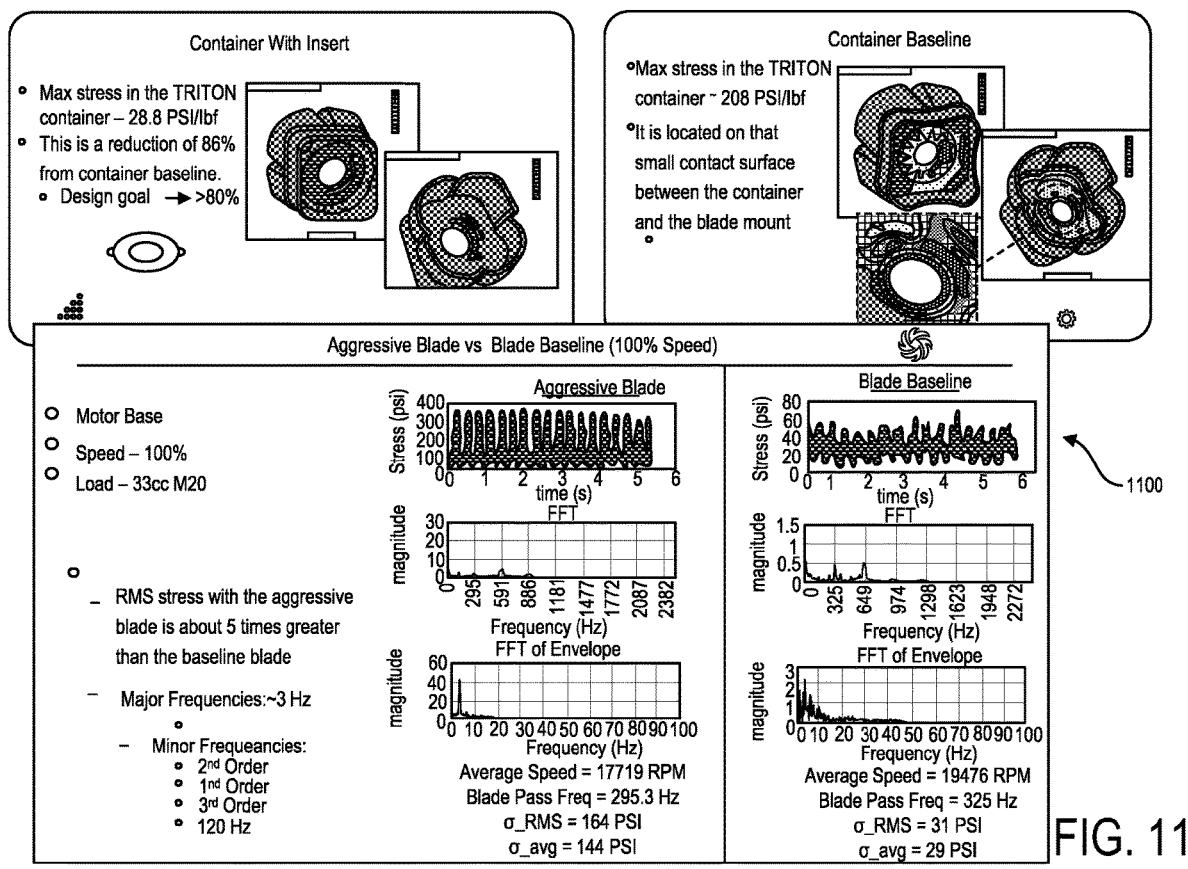
FIG. 11 are test results associated with the container of FIG. 10 in accordance with various disclosed aspects.

FIGS. 10 and 11 illustrate an exemplary container 1000 and tests 1100 showing benefits of the container 1000. It is noted that the container 1000 may comprise similar or the same aspects as those described with reference to the other figures. It is noted that the test results demonstrate reduced stress on a container. As shown in FIG. 11, a container without an insert was stress tested. The maximum stress on the container occurred in a location where a blade assembly contacted the container (e.g., an aperture within a traditional container). In this test, the maximum stress on the container was measured to be about 208 PSI/lbf. The container 1000 was also stress testing within an insert similar or the same as that shown in FIG. 7 (e.g., overmolded plate insert 728). As described here and elsewhere, the insert contact the blade assembly through an aperture. The resulting measured maximum stress on the container was reduced to about 28.8 PSI/lbf, or about 86%. It is noted that the measurements described with reference to tests 1100 are exemplary and are not intended to limit embodiments disclosed herein.

FIG. 11 additionally illustrates strain gage testing of a traditional blade verses a more aggressive blade. As can be seen, the more aggressive blade exerts greater stress on a container. Such an aggressive blade would impart more stress on a container than traditional plastic containers can handle without failure. Disclosed embodiments, however, provide for overmolded inserts that can reduce stress on plastic portions of a container by contacting the aggressive blade assembly with a metal insert.

Figure 12:
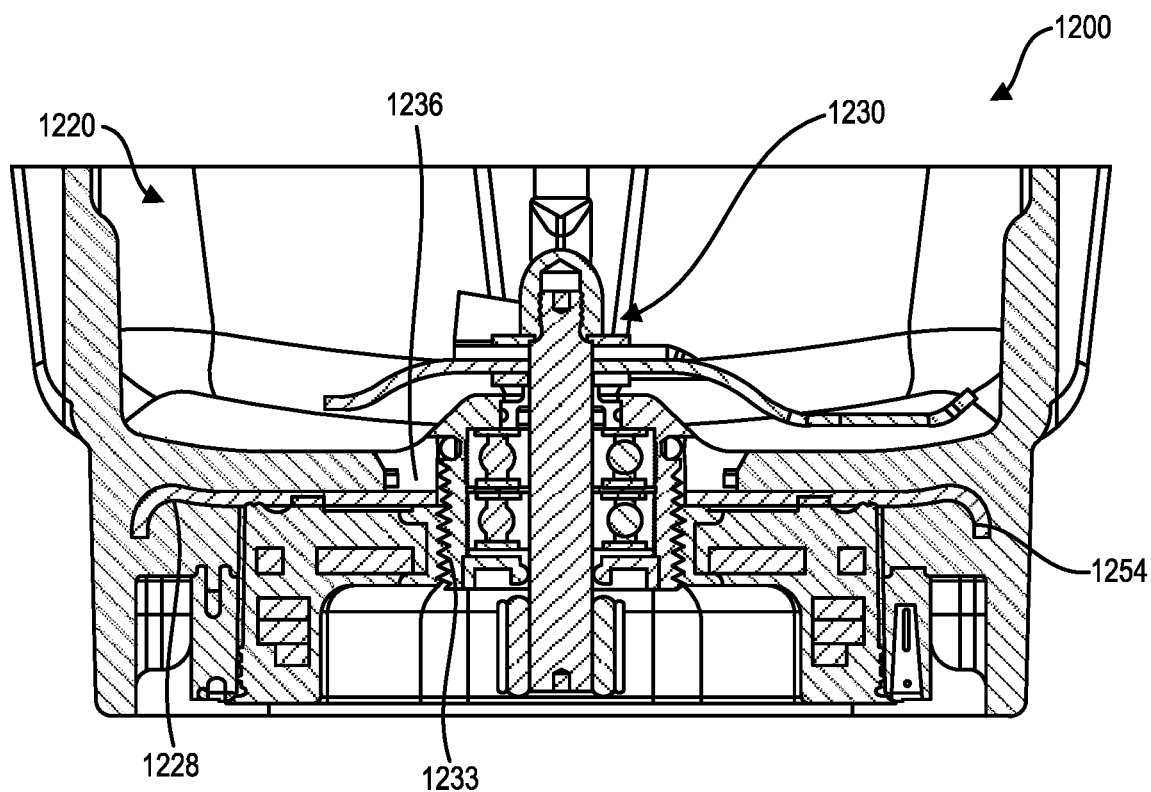
FIG. 12 is a cross-sectional view of a container with a plate insert showing a blade assembly in accordance with various disclosed aspects.
Figure 13:
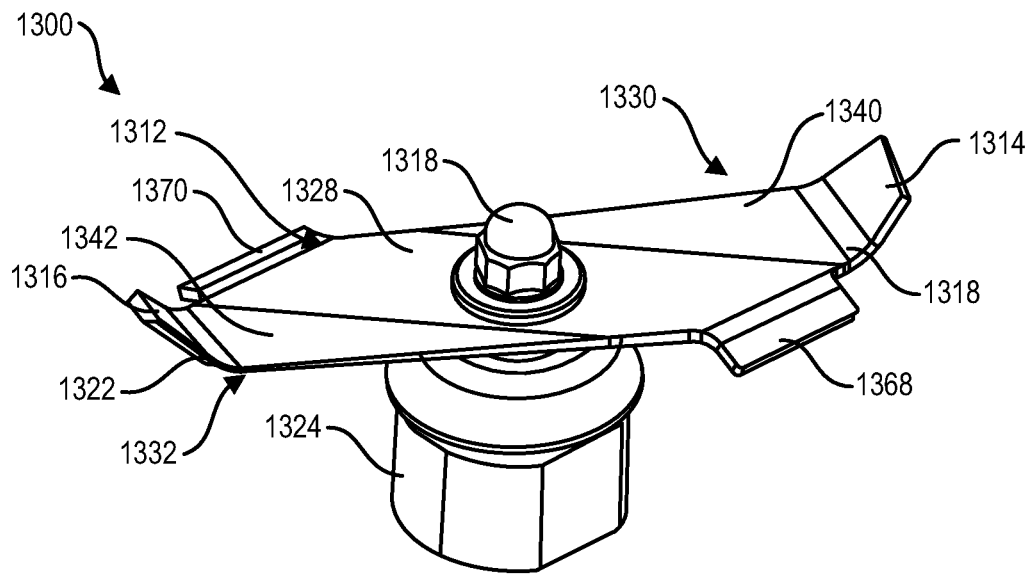
FIG. 13 is an elevated side view of a blade assembly with a balanced blade in accordance with various disclosed aspects.
Figure 14:
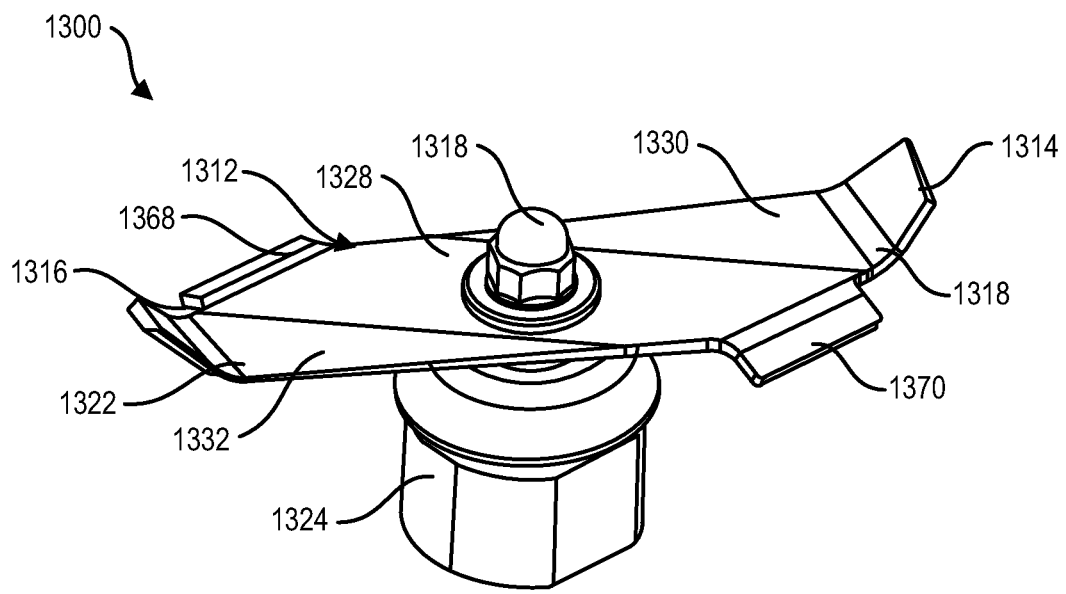
FIG. 14 is an elevated side view with elevation markings of the blade assembly of FIG. 13 in accordance with various disclosed aspects.
Figure 15:
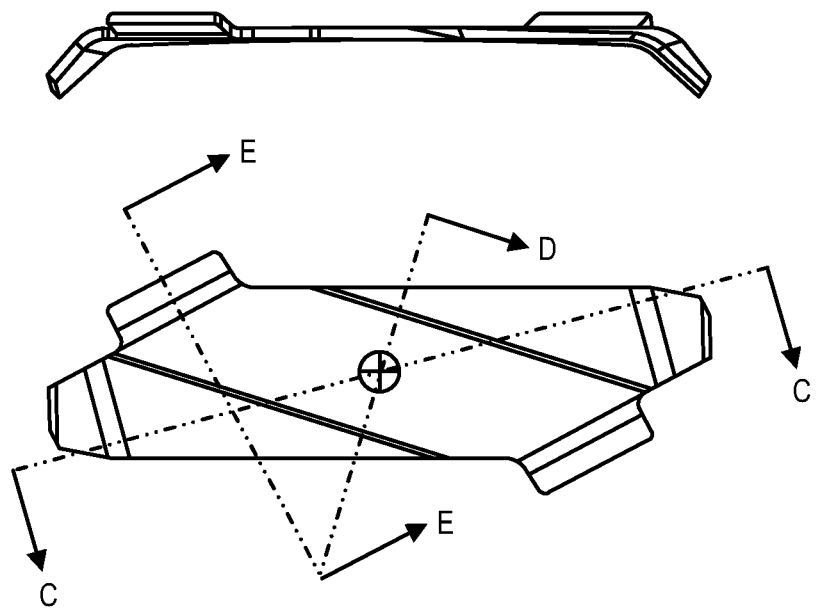
FIG. 15-18 are plan views of the blade assembly of FIG. 13 in accordance with various disclosed aspects.
Figure 16:
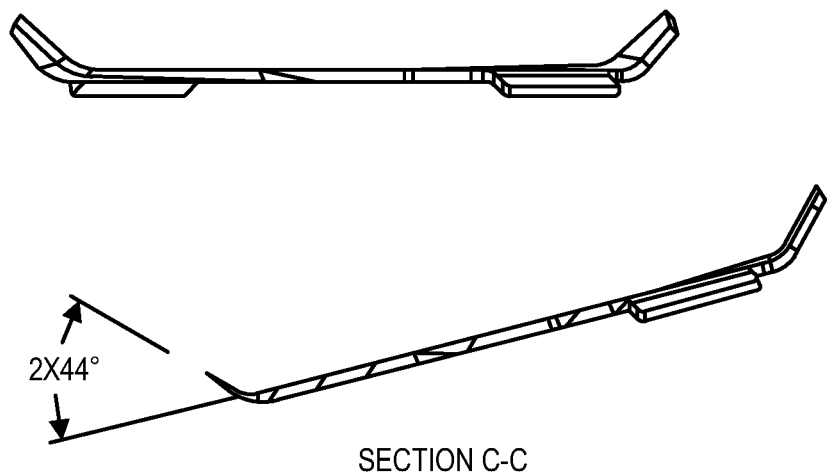
Figure 17:
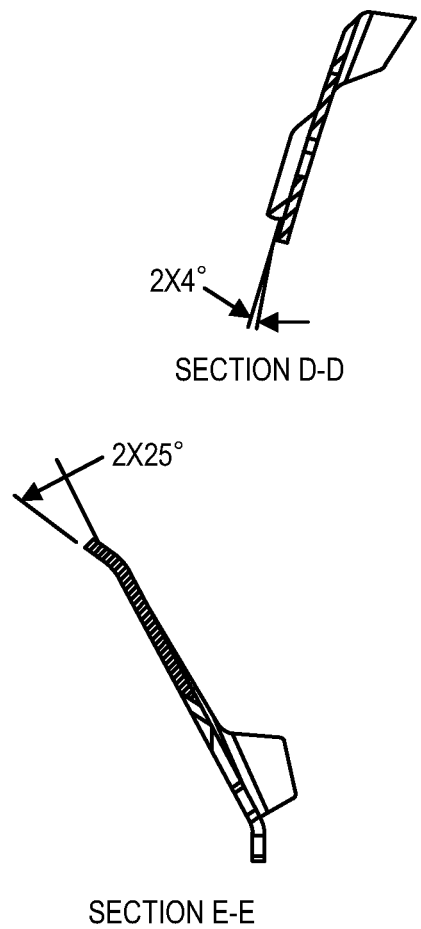
Figure 18:
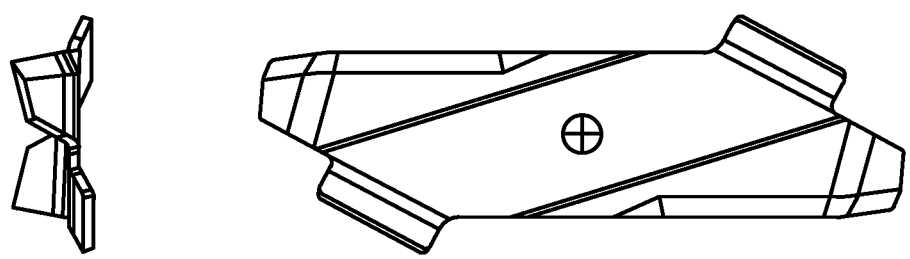
Figure 19:
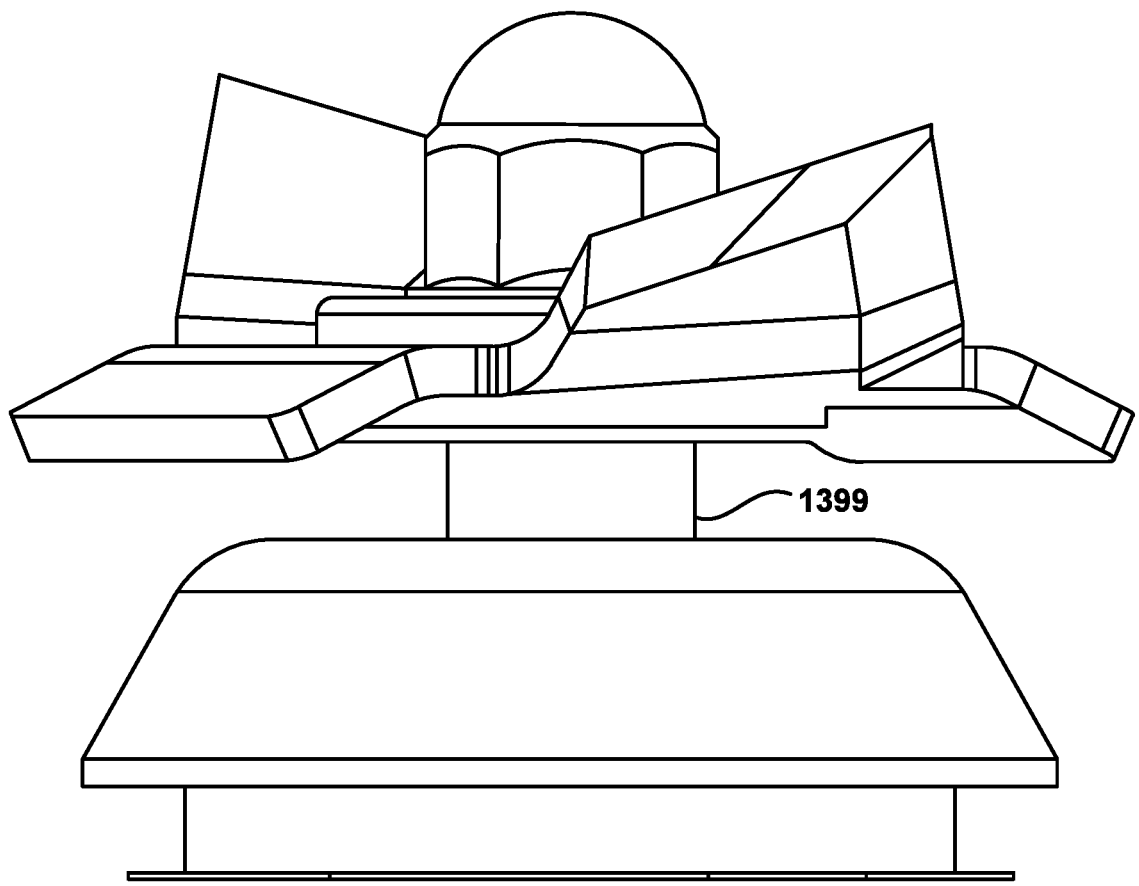
FIG. 19 is a side view of the blade assembly of FIG. 13 in accordance with various disclosed aspects.

FIG. 12 illustrates a cross-sectional view of a container 1200 that comprises a container body 1220, an insert plate 1228, and a blade assembly 1230. It is noted that the container 1200 may include aspects of embodiments described with reference to the other figures of this disclosure. As shown, the plate insert 1228 may include a downturned portion 1254. It is noted, however, that other plate inserts 1228 may be utilized. In another aspect, the body 1220 of the container 1200 is not in direct contact with a mount 1233 of the blade assembly 1230 as described herein.

It is noted that some portions of the blade assembly 1230, such as a radial insert or bearing 1236, may contact the body 1220. However, the mount 1233 is in contact with the plate insert 1228. In another aspect, the plate insert 1228 may be under compressive force. This may prevent or reduce the exposure of the body 1220 to the mount 1233 and compressive forces.

Figure 20:
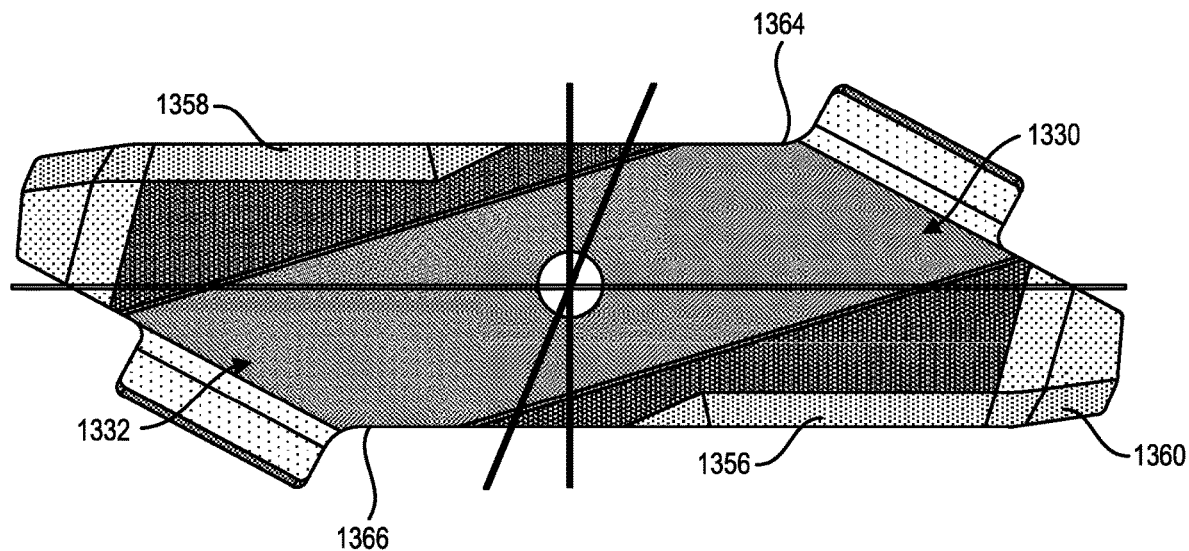
FIG. 20 is a bottom view of a blade of the blade assembly of FIG. 13 in accordance with various disclosed aspects.
Figure 21:
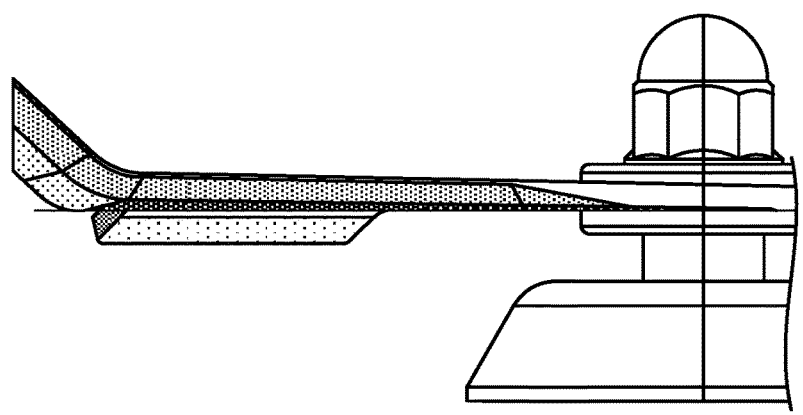
FIG. 21 is second side view of a portion of the blade assembly of FIG. 13 in accordance with various disclosed aspects.
Figure 22:
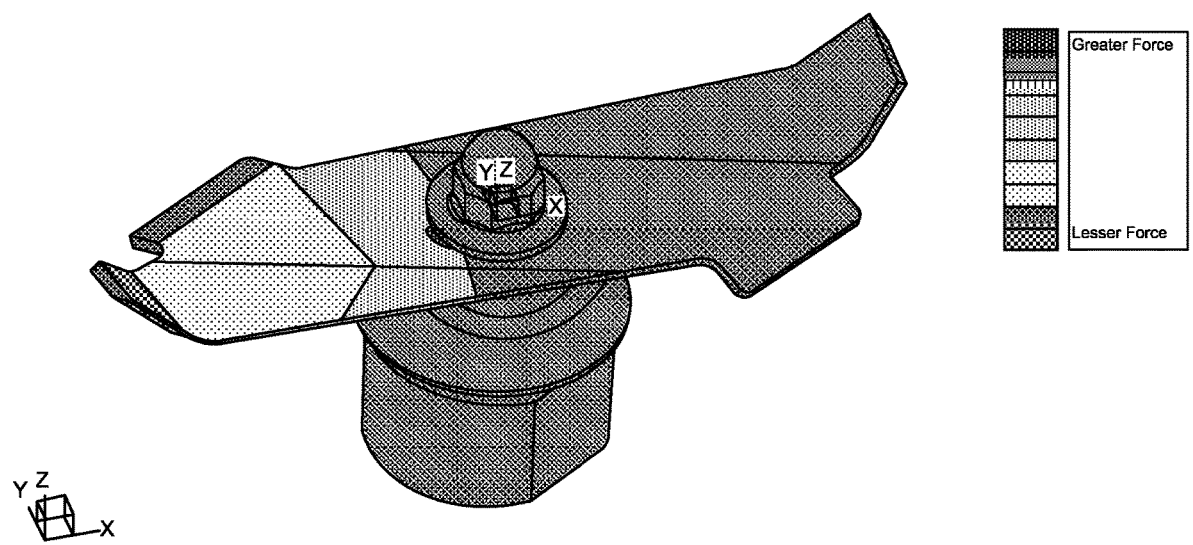
FIGS. 22-24 are test results for tests of the blade assembly of FIG. 13 in accordance with various disclosed aspects.
Figure 23:
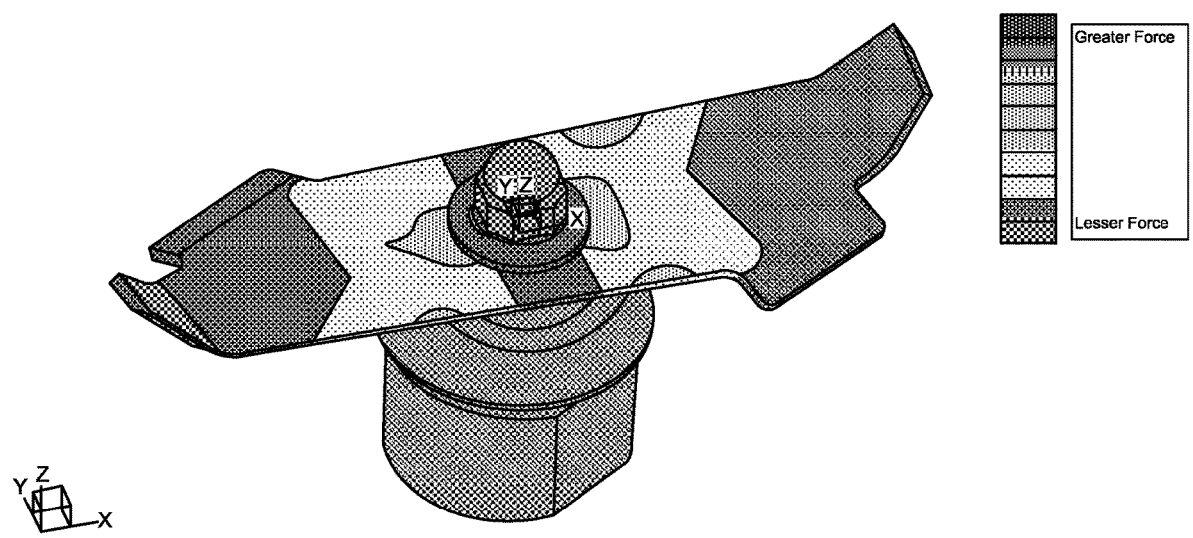

FIGS. 13-21 illustrate a balanced blade assembly 1300 and FIGS. 21-23 illustrate test results associated with the blade assembly 1300. The blade assembly 1300 may primarily include a blade 1312 and a mount 1324. The blade 1312 may be secured to the mount 1324, such as via fastener 1318. It is noted that the blade assembly 1330 may include different or other components not shown for readability, such as a spline, bearings, and the like. Moreover, the blade assembly 1300 may include different or additional blades.

The blade 1312 may be configured for counter-clockwise rotation in the blender container or clockwise rotation. As shown, the blade 1312 is configured for counter-clockwise rotation. The blade 1312 may include a first blade wing 1330 and a second blade wing 1332. The first blade wing 1330 may be of any appropriate shape, size, type or configuration, such as of a generally polygonal configuration. The first blade wing 1330 may be located at any appropriate position on the blade 1312, such as located on one side of the body portion 1328. The body portion 1328 may be generally planar and may extend from a first flap 1368 to a second flap 1370.

The second blade wing 1332 may be of any appropriate shape, size, type or configuration, such as of a generally polygonal configuration. The second blade wing 1332 may be located at any appropriate position on the blade 1312, such as located on a side of the body portion 1328 opposite that of the first blade wing 1330. For example, the first blade wing 1330 and the second blade wing 1332 may extend outwardly from the body portion 1328.

The first blade wing 1330 and second blade wing 1332 may be symmetrically disposed relative to body portion 1328. The symmetrically disposed first and second wings 1330 and 1332 may create a balance such that vibration is reduced during blending. This balance may be particularly well suited for high speed use. The blade assembly 1300 may further comprise a shaft 1399 and wherein the first blade wing 1330 and the second blade wing 1332 are balanced with reference to the shaft 1399.

Portions of the second blade wing 1332 and the first blade wing 1330 may be oriented at any appropriate angle, such as an acute angle, with respect to the horizontal plane of the body portion 1328. For instance, the second blade wing 1332 may comprise an angled portion 1342 and the first blade wing 1330 may comprise an angled portion 1340. The angled portions 1340 and 1342 may be obtusely oriented with respect to the body portion 1328.

The first blade wing 1330 may include a first wing tip 1314 and the second blade wing 1332 may include a second wing tip 1316. The wing tips 1314, 1316 may be of any appropriate shape, size, type or configuration, such as of a generally polygonal configuration. The wing tips 1314, 1316 may be located at any appropriate position on the first blade wing 1330 and second blade wing 1332, respectively. For example, the first wing tip 1314 and second wing tip 1316 may extend outwardly from distal ends of the first blade wing 1330 and second blade wing 1332, respectively. The wing tips 1314, 1316 may each include transition portions 1318 and 1322, respectively. The transition portions 1318 and 1322 may be angled, bent, curved, or otherwise oriented to extend upwards at a greater degree relative the angled portion 1340 and 1342, respectively.

As best shown in FIGS. 20-21, the first blade wing 1330 and the second blade wing 1332 may each include at least one leading edge 1356, 1358, respectively. The leading edges 1356, 1358 may be of any appropriate shape, size, type or configuration, such as of a generally beveled configuration. The leading edges 1356, 1358 may be located at any appropriate position on the respective blade wing 1330, 1332, such as located at a side of the respective blade wing 1330, 1332.

The first wing tip 1314 and the second wing tip 1316 may each include at least one leading edge 1360, 1362, respectively. The leading edges 1360, 1362 may be of any appropriate shape, size, type or configuration, such as of a generally beveled configuration. The leading edges 1360, 1362 may be located at any appropriate position on the respective wing tip 1314, 1316, such as located at a side of the respective wing tip 1314, 1316.

The cutting patterns of the blade 1312 may be defined by the leading edges 1356, 1358 of the first blade wing 1330 and second blade wing 1332, respectively, and by the leading edges 1360, 1362 of the first wing tip 1314 and second wing tip 1316, respectively. Each of these leading edges 1356, 1358, 1360, 1362 may be sharpened by respectively beveling the first blade wing 1330, second blade wing 1332, first wing tip 1314 and second wing tip 1316. It is noted, however, that in some embodiments the leading edges 1356, 1358, 1360, 1362 may be non-sharpened such as comprising a planar or squared edge at the first blade wing 1330, second blade wing 1332, first wing tip 1314 and second wing tip 1316. The first blade wing leading edge 1356 and the first wing tip leading edge 1360 may be formed along one side of the blade 1312 and may share cutting responsibilities along that side of the blade 1312. The second blade wing leading edge 1358 and the second wing tip leading edge 1362 may be formed along the other side of blade 1312 and may share cutting responsibilities along that side of the blade 1312.

Since the first blade wing 1330 and the second blade wing 1332 may be symmetrically oriented with respect to the body portion 1328, the blade 1312 may have a single cutting pattern. The first blade wing 1330 and the second blade wing 1332 may have the same mass and the same bend patterns. This may allow material to be drawn into the cut path and may allow for balanced force imparted on the foodstuff. The force balance allows for higher viscosity and RPM, while providing lower stress on the blade 1312 and containers. The resulting balance may also reduce noise and prevent or reduce damage or wear to containers, bearings and the blade 1312 itself.

The first blade wing 1330 may include at least one trailing edge 1364 and the second blade wing 1332 may include at least one trailing edge 1366. The trailing edges 1364, 1366 may be of any appropriate shape, size, type or configuration. The trailing edges 1364, 1366 may be located at any appropriate position on the respective blade wing 1330, 1332, such as located at a side of the respective blade wing 1330, 1332. For example, the trailing edges 64, 66 may be located adjacent to the respective wing tip 1314, 1316.

The first blade wing 1330 may include a first wing flap 1368 and the second blade wing 1332 may include a second wing flap 1370. The wing flaps 1368, 1370 may be of any appropriate shape, size, type or configuration, such as of a generally rectangular configuration. The wing flaps 1368, 1370 may be located at any appropriate position on the respective blade wing 1330, 1332, such as generally opposite that of the respective leading edges 1356, 1358. For example, the first wing flap 1368 and second wing flap 1370 may extend outwardly at an angle from the trailing edges 1364, 1366 of the first blade wing 1330 and second blade wing 1332, respectively. The wing flaps 1368, 1370 may be oriented at an obtuse angle with respect to the body 1328.

The wing flaps 1368, 1370 may be provided to control the axial flow of the working medium relative to the first cutting pattern and second cutting pattern irrespective of the angle of attack of the first blade wing 1330 and the second blade wing 1332. For example, the wing flaps 1368, 1370 may be positioned at any appropriate angle, such as angled downwardly or upwardly, to respectively increase the effective camber of the blade wings 1330, 1332, respectively. Due to the effective camber increase resulting from the addition of the wing flaps 1368, 1370, low pressures may be generated by the wing flaps 1368, 1370. The low pressures generated by the wing flaps 1368, 1370 may compel axial movement of the working medium.

In embodiments, as the blade 1312 is rotating, the working medium flowing underneath blade 1312 may impinge the downwardly angled wing flaps 1368, 1370. As such, the wing flaps 1368, 1370 may deflect the working medium away from the blade 1312. Such deflection may cause the wing flaps 1368, 1370 to batter against the working medium, as well as push the working medium away from the path of the wing flaps 1368, 1370, thereby generating low pressures adjacent to the wing flaps 1368, 1370.

It is noted that the wing flaps 1368, 1370 may be angled upwardly or downwardly. The amount of working medium flowing across the first cutting pattern and second cutting pattern may be increased by increasing the slopes of the wing flaps 1368, 1370. Furthermore, as discussed above, the downward and upward angle of the first wing flap 1368 may draw the working medium downwardly and upwardly, respectively, through the first cutting pattern.

In addition to controlling the axial flow of the working medium, the orientation of the wing flaps 1368, 1370 may also control the radial flow of the working medium relative to the axis of rotation of the blade 1312. For example, the wing flaps 1368, 1370 may be canted inwardly relative to the leading edges 1356, 1358, respectively. That is, because the first blade wing 1330 and second blade wing 1332 may gradually narrow as the blade wings 1330, 1332 may extend outwardly from the body portion 1328, the trailing edges 1364, 1366 may be angled such that the wing flaps 1368, 1370 may be canted inwardly. As such, the working medium deflected away from the path of the wing flaps 1368, 1370 as the blade 1312 is rotating may be pushed radially inwardly relative to the first blade wing 1330 and second blade wing 1332, respectively.

Figure 24:
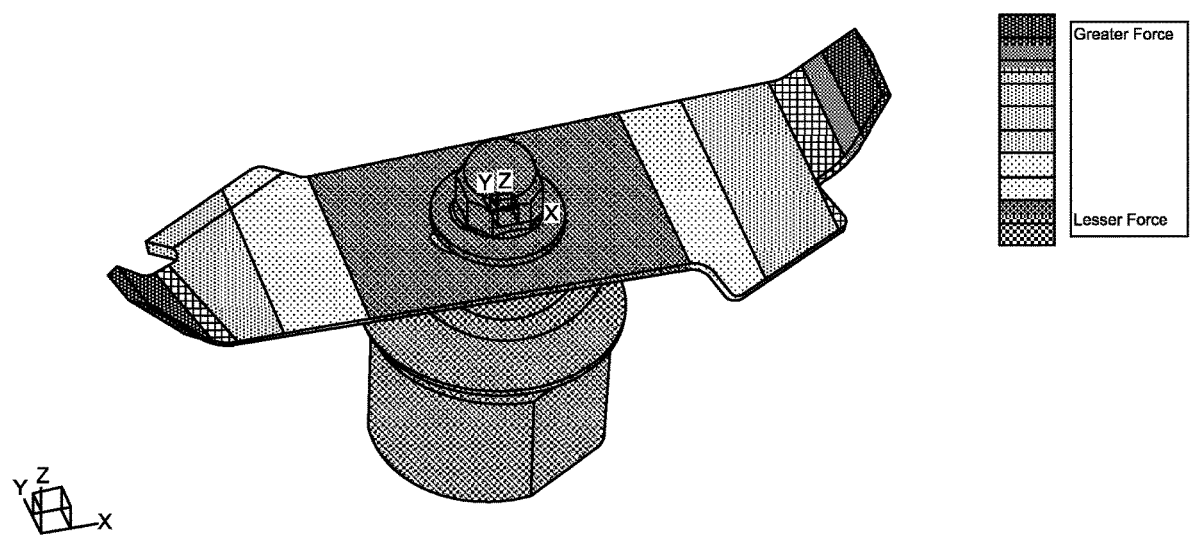

FIGS. 22-24 show testing results based on various disclosed embodiments. As can be seen, the forces exerted on and by disclosed blades may be greater than those of traditional blades. Utilizing disclosed aspects, containers may incorporate such blades without damaging a container, such as by employing disclosed inserts. FIGS. 22-24 illustrate different levels of force imparted or experienced by portions of the balanced blade assembly 1300 in different levels of shading. FIG. 22 illustrates force during a first speed of rotation, FIG. 23 illustrates force during a second speed of rotation, and FIG. 24 illustrates speed during a third speed of rotation, wherein the first speed is the slowest and the third speed is the fastest. In FIG. 22, the force exerted is generally negligible. As the speeds increase, it is shown that having symmetric angles and weights between the blade wings results in balanced force on each blade wing. This results in reduce noise production, less wobble motion, reduced force or damage to bearings, containers or other components, and generally improved blend quality while not increasing power draw. It is noted that conventional wisdom directs one to have non-symmetrical wings to attempt to have wings pass through different levels or areas of a blended product. Disclosed embodiments, however, provide symmetrical wings that may be pitched to draw blended product and create an efficient blend.

Figure 25:
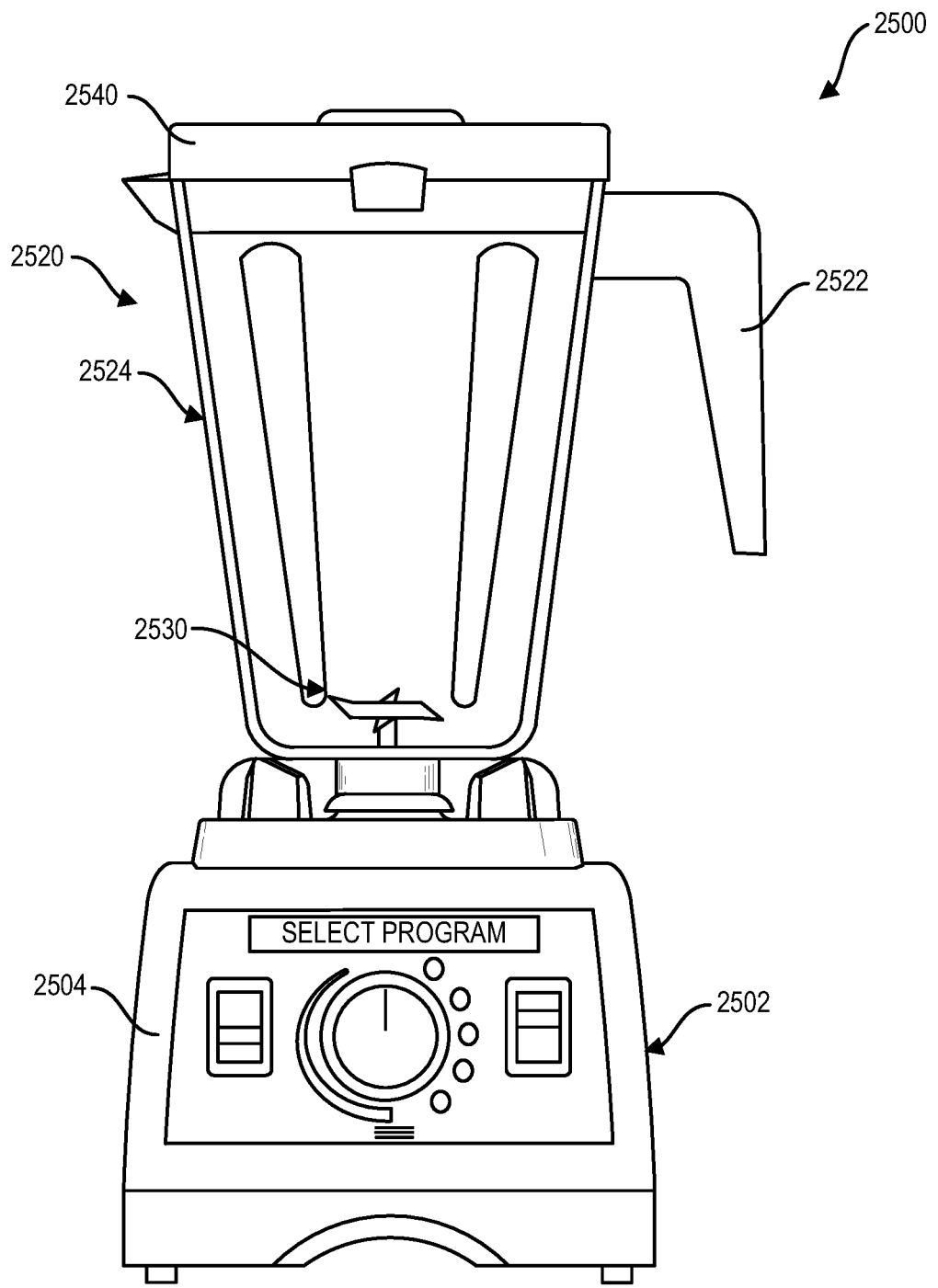
FIG. 25 is a blender system in accordance with various disclosed aspects.

FIG. 25 illustrates an exemplary blending system 2500 in accordance with various disclosed embodiments. System 400 may utilize various disclosed aspects. For instance, system 2500 may include a large format container, or other blending container as described herein. It is noted that blending system 2500 may allow for interchangeable containers.

System 2500 primarily includes a blender base 2502, a container 420 (or 100) operatively attachable to the blender base 2502, a blade assembly 2530, and a lid 2540 that may be operatively attached to the container. The container 2520 may include walls 2524 and a handle 2522. Foodstuff may be added to the container 2520 for blending. It is noted that the container 2520 may comprise various materials such as plastics, glass, metals, or the like. In another aspect, container 2520 may be powered in any appropriate manner.

The blade assembly 2530, container 2520, and base 2502 may removably or irremovably attach. The container 2520 may be powered in any appropriate manner. While shown as a large-format system, system 2500 may comprise a single serving style system, where the container is filled, a blender base is attached to the container, and then the container is inverted and placed on a base. In another aspect, the container 2520 may comprise different sizes and shapes, such as cylindrical or the like.

The base 2502 includes a motor disposed within a housing 2504. The motor selectively drives the blade assembly 2530. The blade assembly 2530 may agitate, impart heat, or otherwise interact with contents within the container. Operation of the blender system 2500 may impart heat into the contents within container 2520, such as through a magnet and an exciter that operatively induce heat through rotation of the magnet relative the exciter.

In at least one embodiment, the blending system 2500 may identify or detect whether the system 2500 is interlocked through mechanical detection (e.g., push rods), user input, image recognition, magnetic detection (e.g., reed switches), electronic detection (e.g., inductive coils, a near field communication (NFC) component), or the like.

System 2500 and processes described herein generally relate to blending or food-processing systems and include a food-processing disc comprising one or more inductive coils. In another aspect, one or more of the disc(s) and/or lid may comprise an NFC component that may interact with an NFC component of a blender base. The NFC component of the blender base may receive information regarding the type of container and the blender base may utilize the information to determine a blending process to be utilized by the system.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define embodiments disclosed herein. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A container assembly comprising:
   a body comprising an open end and a closed end, the open end and the closed end defining a cavity for receiving foodstuff, the closed end defining a bottom of the cavity; and
   a plate insert comprising a plate insert body that is generally planar, wherein the plate insert is disposed within the closed end and overmolded into the closed end such that the bottom of the cavity is in contact with the plate insert, and a material of the body is above and below the plate insert, and wherein the plate insert comprises a different material than the material of the body.

2. The container assembly of claim 1, wherein the closed end of the body is generally planar and wherein the plate insert body and the closed end are generally coplanar.

3. The container assembly of claim 1, wherein the material of the body comprises a food-grade plastic.

4. The container assembly of claim 1, wherein the plate insert comprises at least one protrusion extending from an external perimeter of the plate insert.

5. The container assembly of claim 4, wherein the at least one protrusion comprises an aperture, and wherein a portion of the material of the body is disposed within the aperture.

6. The container assembly of claim 4, wherein the at least one protrusion operatively prevents rotation of the plate insert relative the body.

7. The container assembly of claim 1, wherein the plate insert comprises an aperture operatively receiving a mount of a blade assembly.

8. The container assembly of claim 7, wherein the mount of a blade assembly is free from contact with the closed end of the body.

9. The container assembly of claim 7, further comprising a retainer nut that operatively attaches to the mount of a blade assembly to the closed end of the body, and wherein the retainer nut applies compression on the plate insert.

10. The container assembly of claim 1, wherein the body is continuous.

11. A container assembly comprising:
    a container body comprising an open end and a closed end, wherein the container body comprises plastic;
    a blade assembly comprising a mount; and
    a plate insert disposed at the closed end and overmolded directly into the closed end such that the plate insert is positioned between material of the body, wherein the plate insert comprises metal, and
    wherein a first portion of the plate insert is free from contacting the plastic of the container body, and wherein the mount contacts the first portion of the plate insert such that the mount does not directly contact the plastic of the container body.

12. The container assembly of claim 11, wherein the blade assembly further comprises at least one blade comprising a first wing and a second wing.

13. The container assembly of claim 12, wherein the first wing and the second wing comprise substantially similar shapes.

14. The container assembly of claim 12, wherein the first wing and the second wing comprise substantially similar weights.

15. The container assembly of claim 12, wherein the blade assembly further comprises a shaft and wherein the first wing and the second wing are balanced with reference to the shaft.

16. The container assembly of claim 11, further comprising a bearing comprising a metal material, wherein the mount further operatively attaches to the bearing and the plate insert, and wherein the bearing contacts the closed end.

17. The container assembly of claim 11, wherein the container body is uninterrupted.

* * * * *